(12) United States Patent
Nagata et al.

(10) Patent No.: US 7,100,177 B2
(45) Date of Patent: Aug. 29, 2006

(54) REPRODUCING/RECORDING APPARATUS

(75) Inventors: Hitoshi Nagata, Tokorozawa (JP); Yuji Morita, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 217 days.

(21) Appl. No.: 10/663,696

(22) Filed: Sep. 17, 2003

(65) Prior Publication Data
US 2004/0076087 A1    Apr. 22, 2004

(30) Foreign Application Priority Data
Sep. 20, 2002   (JP) ............................ 2002-276107

(51) Int. Cl.
*G11B 17/04* (2006.01)
(52) U.S. Cl. ................................... 720/614
(58) Field of Classification Search ................ 720/616, 720/614; 369/75.11, 75.21, 77.11, 77.21
See application file for complete search history.

(56) References Cited

U.S. PATENT DOCUMENTS

| | | | |
|---|---|---|---|
| 5,544,147 A * | 8/1996 | Koizumi et al. ......... | 369/30.85 |
| 5,764,616 A * | 6/1998 | Kim et al. ............... | 369/30.92 |
| 5,798,997 A * | 8/1998 | Ware et al. .............. | 720/660 |
| 5,812,511 A * | 9/1998 | Kawamura et al. ....... | 720/616 |
| 5,870,360 A * | 2/1999 | Ito et al. .................. | 369/30.85 |
| 5,914,929 A * | 6/1999 | Kato et al. ............... | 720/656 |
| 6,278,677 B1* | 8/2001 | Sako et al. ............... | 720/607 |
| 6,665,255 B1* | 12/2003 | Inoue et al. ............. | 720/656 |
| 2003/0214895 A1* | 11/2003 | Lee et al. ................ | 369/75.2 |

* cited by examiner

*Primary Examiner*—Allen Cao
(74) *Attorney, Agent, or Firm*—Armstrong, Kratz, Quintos, Hanson & Brooks, LLP

(57) ABSTRACT

A reproducing/recording apparatus including a first disk tray (11) for mounting a first disk thereon and a second disk tray (12) for mounting a second disk that is of a type different from the type of the firs disk thereon. The first disk tray (11) is adapted to be moved into and away from the apparatus through a single disk inlet/outlet port (10A) with the second disk tray (12) laid thereon. The reproducing/recording apparatus can be downsized even when it is adapted to reproduce information from and record information onto a number of disks of different types.

10 Claims, 28 Drawing Sheets

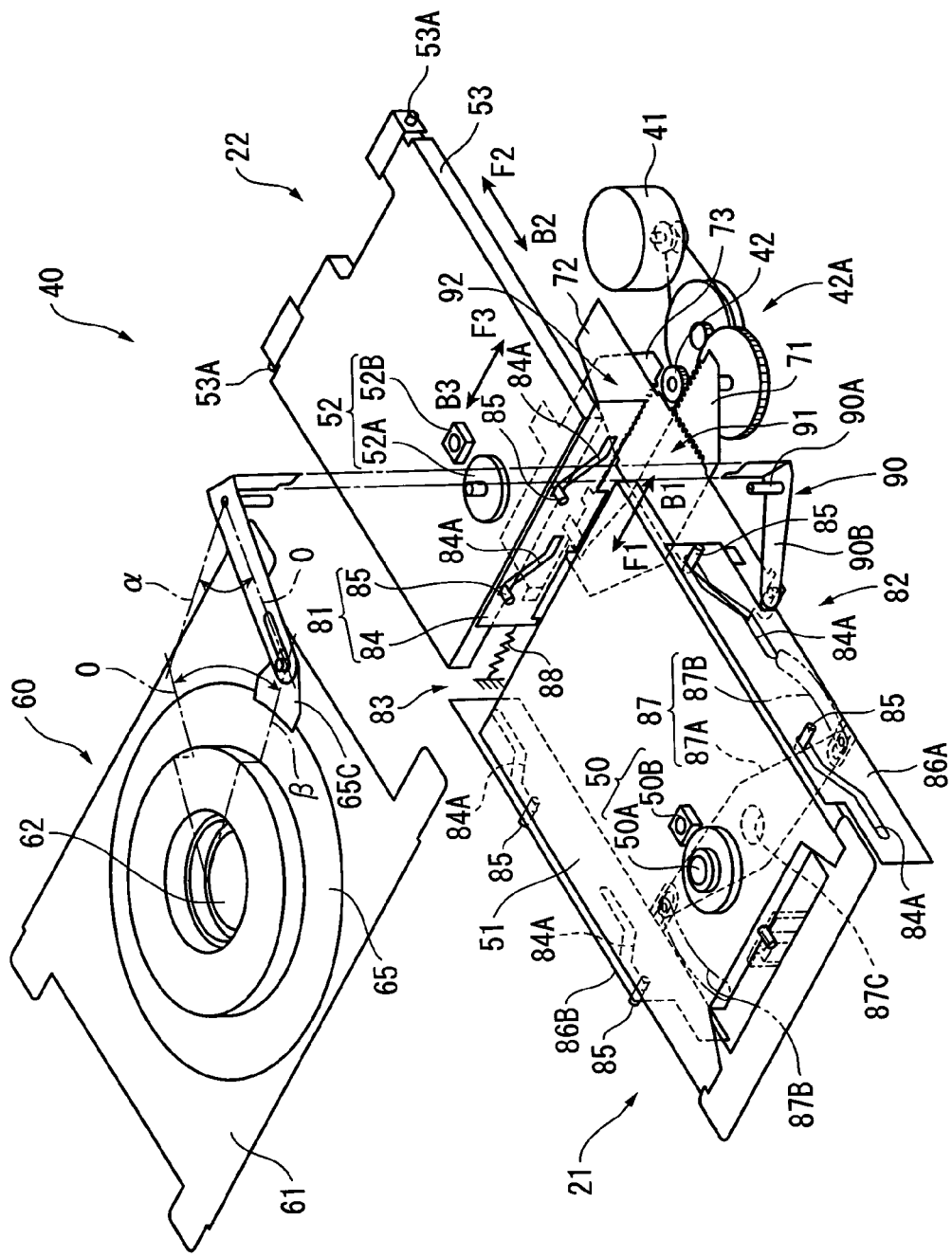

FIG.20

| | | A | B | C | D | E | F | G | H | I |
|---|---|---|---|---|---|---|---|---|---|---|
| FIRST RACK 71 | | | RIGHT ← | | → LEFT | | | | | |
| SECOND RACK 72 | | | | FORE ← | | | → | BACK | | |
| THIRD RACK 73 | | | | | | | | LEFT ← | | → RIGHT |
| FIRST CAM MEMBER 84 | RIGHT / LEFT | | | | | | | | | |
| SECOND REPRODUCING RECORDING MECHANISM 22 | UP / DOWN | | | | | | | | | |
| SECOND CAM MEMBER 86A | BACK / FORE | | | | | | | | | |
| SECOND CAM MEMBER 86B | BACK / FORE | | | | | | | | | |
| FIRST REPRODUCING RECORDING MECHANISM 21 | UP / DOWN | | | | | | | | | |
| ANGLE MEMBER 90B | α° / 0° | | | | | | | | | |
| DISCAL MEMBER 65 | β° / 0° | | | | | | | | | |
| CYLINDRICAL MEMBER 67 | UP / DOWN | | | | | | | | | |
| CLAMP 62 | UP / DOWN | | | | | | | | | |
| ARM 64B | UP / DOWN | | | | | | | | | |
| CONTACT 64C | UP / DOWN | | | | | | | | | |

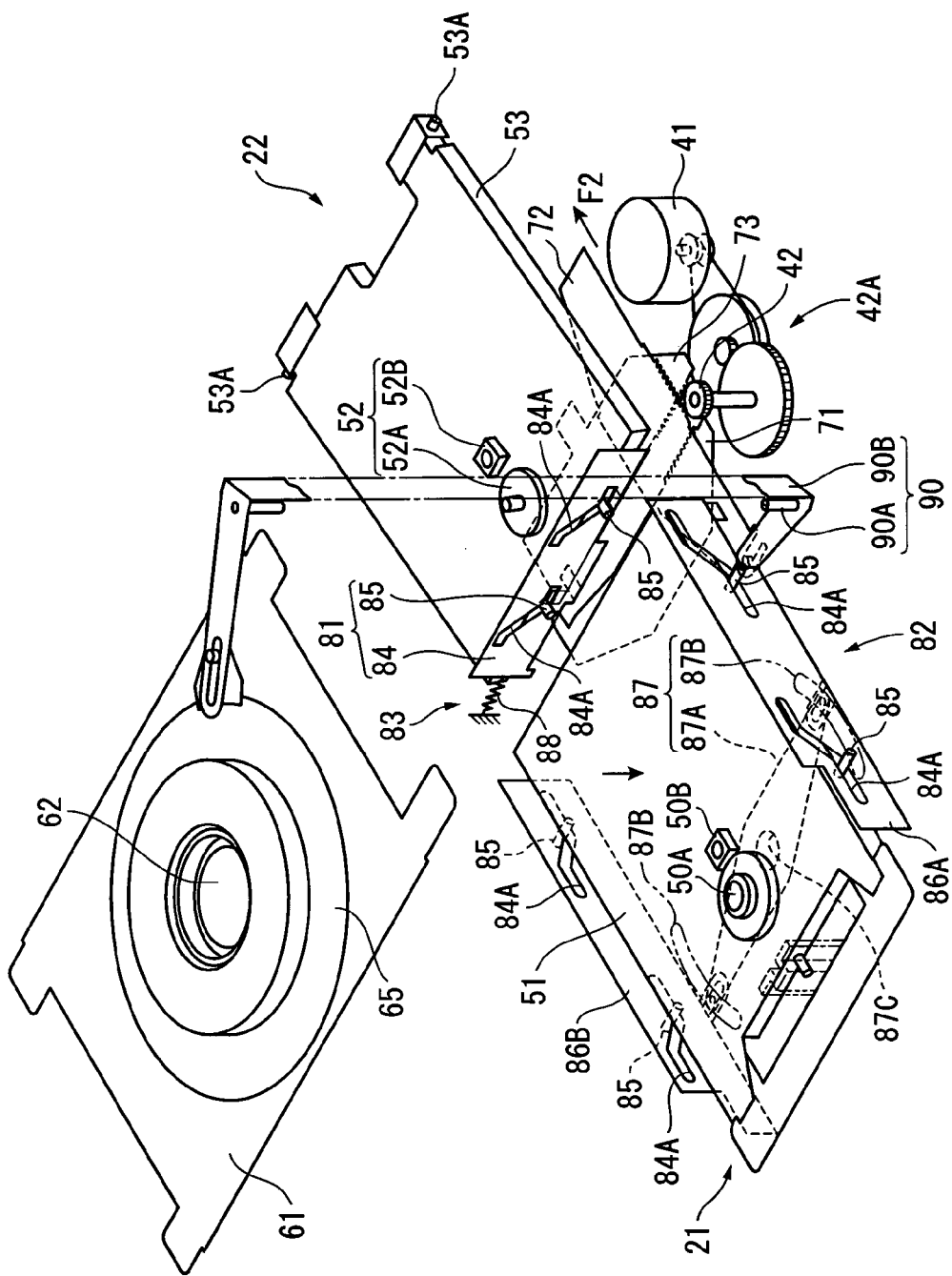

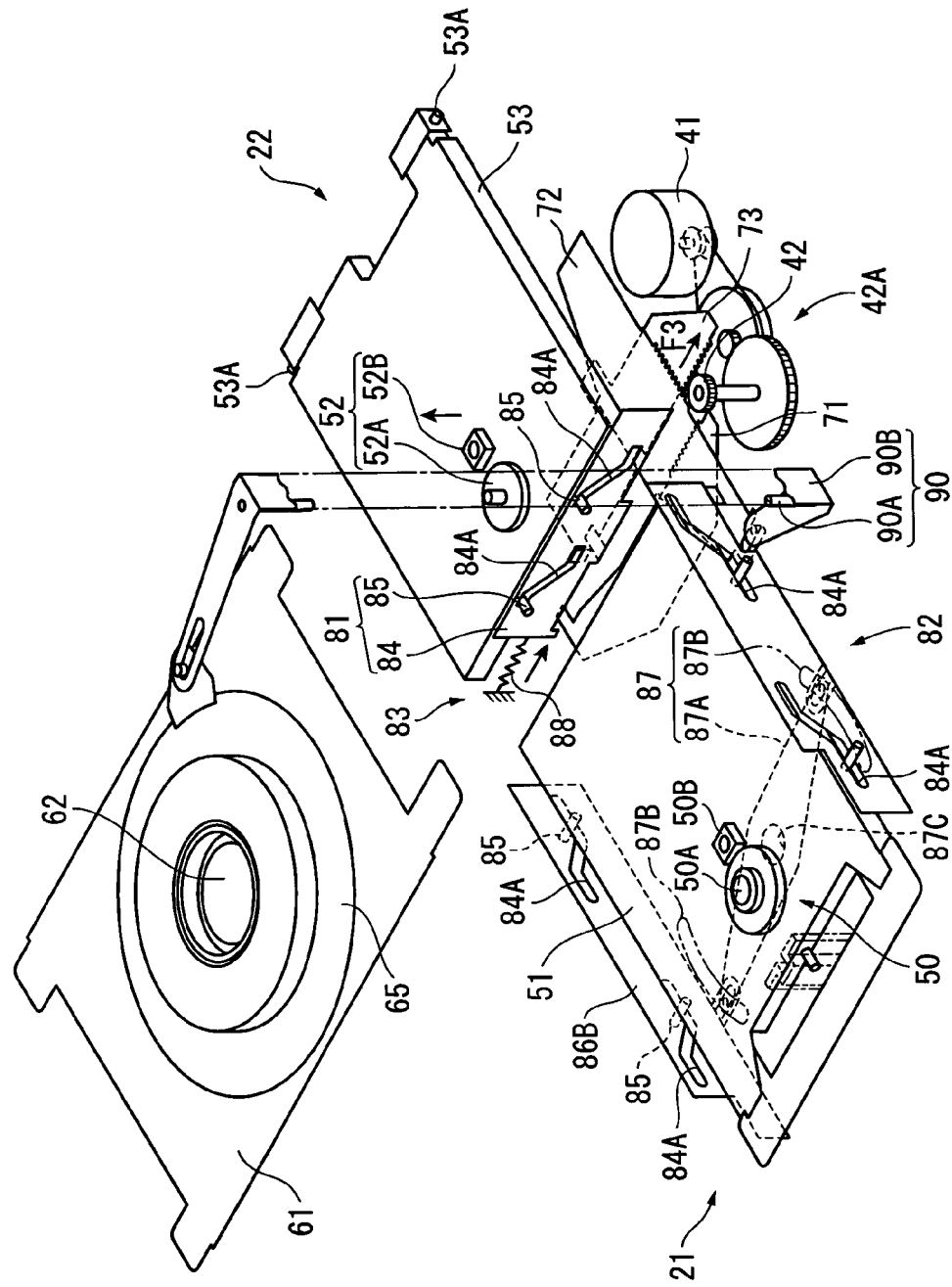

REPRODUCING/RECORDING APPARATUS

BACKGROUND OF THE INVENTION

1. Field of the Invention

The present invention relates to a reproducing/recording apparatus mounting a disk on a disk tray.

2. Description of Related Art

A reproducing/recording apparatus for reproducing information from and/or recording information onto a disk have been used.

Such reproducing/recording apparatus includes a reproducing/recording mechanism for reproducing information from and/or recording information onto a disk mounted on a disk tray and a disk that is mounted on a disk tray is moved into and out from the apparatus main body through a disk inlet/outlet port.

Disks that can used for information reproducing/recording include those that are contained in a cartridge, which may be referred to as cartridge/disk combinations, and bare disks that are not contained in a cartridge as well as those that are used with a blue laser beam for information reproducing/recording and those that are used with a red laser beam for information reproducing/recording. Thus, disks may have different shapes and may be used with different reproducing/recording technique.

In order to make a single reproducing/recording apparatus capable of dealing with disks of different types, conventional reproducing/recording apparatus are provided with a number of disk inlet/outlet ports and a number of disk trays for disks of so many different types. Normally the disk inlet/outlet ports are arranged horizontally along the front side of the apparatus.

More specifically, a disk inlet/outlet port and a disk tray are combined to form a set and a number of such sets are arranged horizontally along the front side of the apparatus.

Thus, in conventional reproducing/recording apparatus, the space for arranging an electronic substrate to be used for driving reproducing/recording mechanisms is limited. However, efforts for saving the space for arranging an electronic substrate face limitations and hence there is a problem that the apparatus of the type under consideration inevitably have large dimensions.

SUMMARY OF THE INVENTION

An object of the present invention is to provide a reproducing/recording apparatus that is small but can reproduce information from and record information onto a number of disks of different types.

The reproducing/recording apparatus according to the present invention includes a first disk tray for mounting a first disk thereon and a second disk tray for mounting a second disk that is of a type different from the type of the first disk thereon, the first disk tray, carrying the second disk tray thereon being adapted to be moved into and away from the apparatus through a single disk inlet/outlet port.

BRIEF DESCRIPTION OF THE DRAWINGS

FIG. 13 is a perspective view illustrating the overall configuration of a 4-position shifting mechanism;

FIG. 20 is a timing chart illustrating the components of the 4-position shifting mechanism and their time series positional relationships;

FIG. 27 is a perspective view illustrating the operation of the 4-position shifting mechanism; and FIG. 28 is a perspective view illustrating the operation of the 4-position shifting mechanism.

DETAILED DESCRIPTION OF PREFERRED EMBODIMENT(S)

An embodiment of the present invention will be described below with reference to attached drawings.

Figure 1:
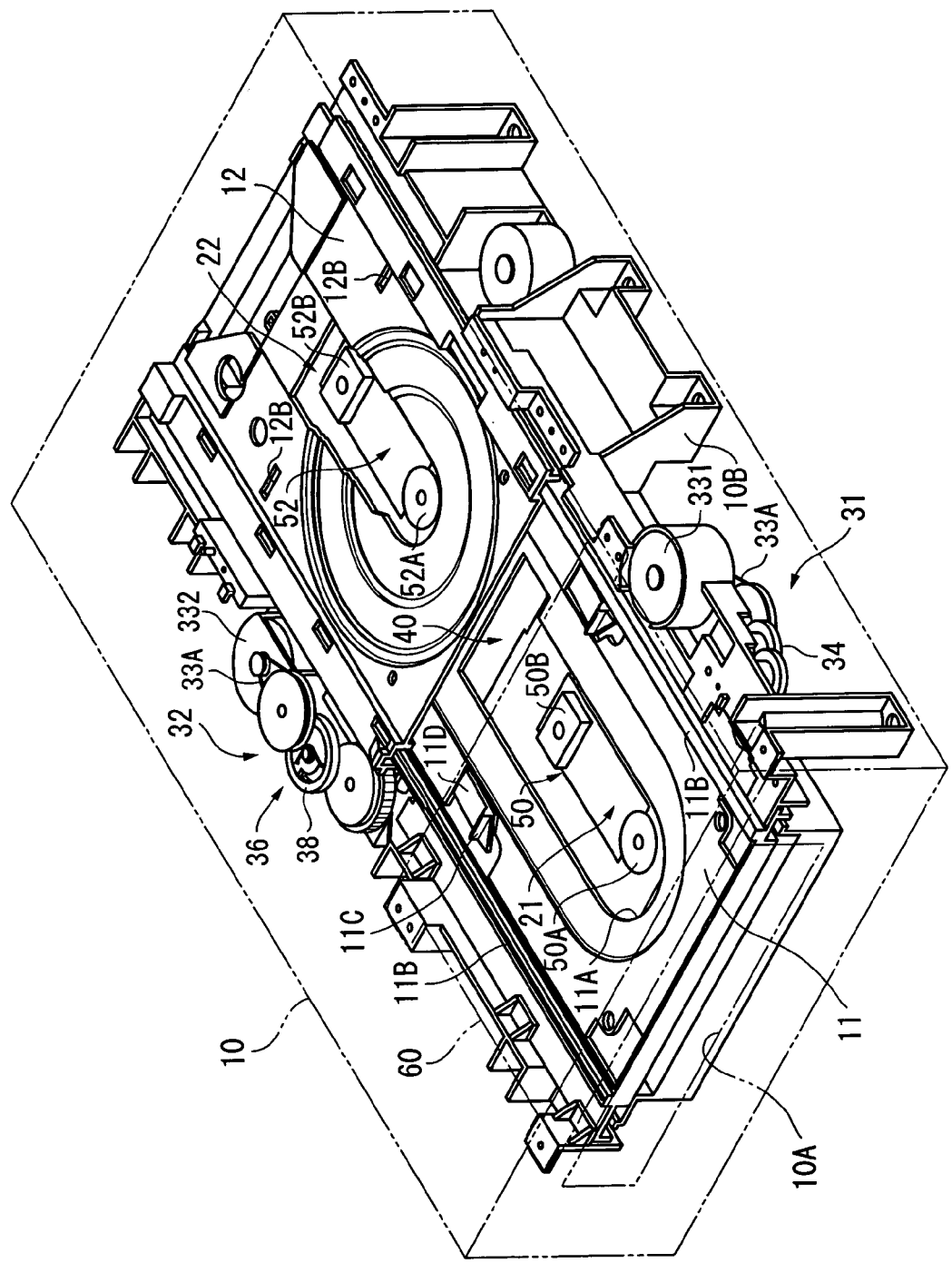
FIG. 1 is a perspective view illustrating the overall configuration of a reproducing/recording apparatus according to an embodiment of the present invention, thereof.

FIG. 1 is a perspective view illustrating the overall configuration of a reproducing/recording apparatus according to an embodiment of the present invention.

Referring to FIG. 1, the reproducing/recording apparatus included a casing 10 having a disk inlet/outlet port 10A formed at the front side thereof, a first disk tray 11, a second disk tray 12, both the first and second disk trays being arranged in the inside of the casing 10, a first reproducing/recording mechanism 21 to be used for reproducing/recording operations of both a first disk 1 and a second disk 2, a second reproducing/recording mechanism 22 to be used for reproducing/recording operations of the second disk 2, a first tray driving mechanism 31 to be used for driving the first disk tray 11 to move to the side of the disk inlet/outlet port 10A, a second tray driving mechanism 32 to be used for driving the second disk tray 12 to the side of the disk inlet/outlet port 10A and a 4-position shifting mechanism 40 to be used for shifting the position of each of the first reproducing/recording mechanism 21 and the second reproducing/recording mechanism 22 to one of the predetermined four positions (see FIG. 13).

The casing 10 has a box-shaped profile and made of metal or synthetic resin. It is provided on the front side thereof with a disk inlet/outlet port 10A along with operation buttons, a power switch and a display section, which are not illustrated in FIG. 1. The casing 10 also has in the inside thereof a substrate that is used to operate the first reproducing/recording mechanism 21 and so on.

A frame 10B is arranged in the inside of the casing 10. The first disk tray 11 and the second disk tray 12 are held above the frame 10B in such a way that each of them is freely movable toward and away from the disk inlet/outlet port 10A.

Figure 2A:
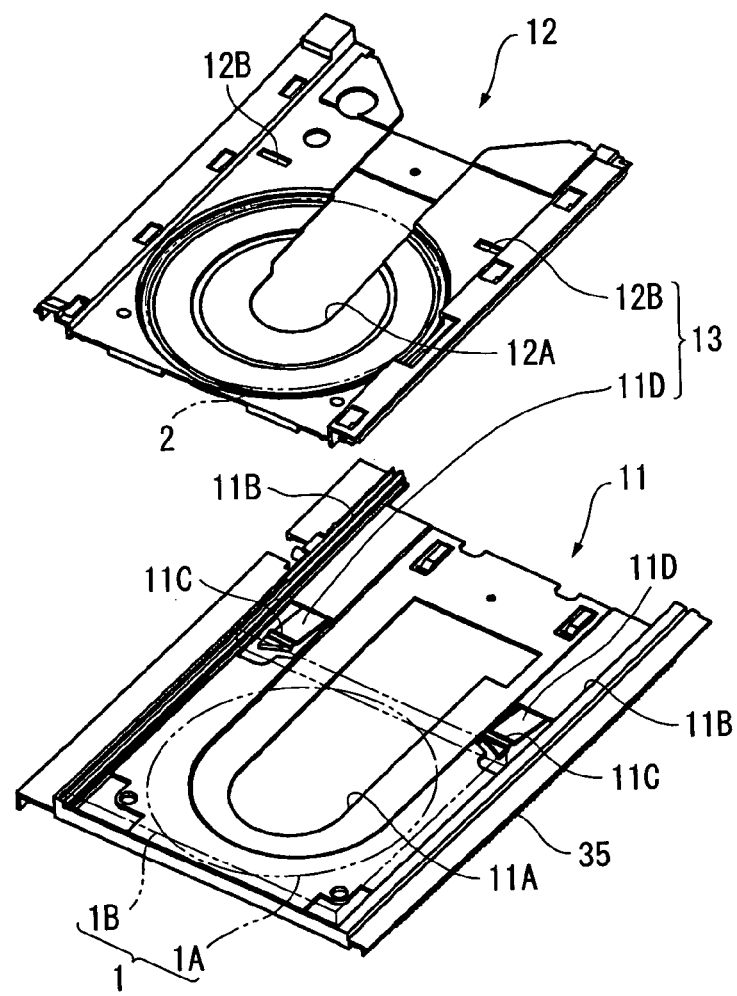
FIGS. 2A and 2B are perspective views of a first disk tray and a second disk tray.
Figure 2B:
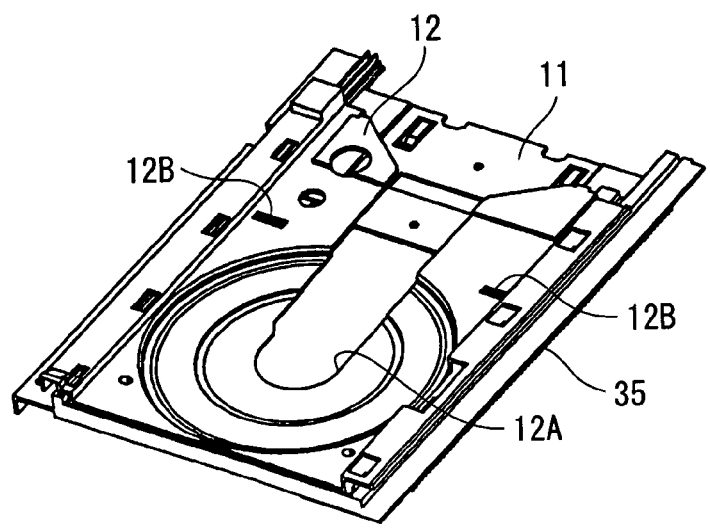

FIGS. 2A and 2B illustrate the specific configuration of the first disk tray 11 and that of the second disk tray 12.

Referring to FIG. 2A, the fist disk tray 11 is dish-shaped and has a substantially rectangular profile as viewed from above. It has an aperture 11A arranged at the center thereof so that the first disk 1 may be irradiated with a laser beam emitted from the first reproducing/recording mechanism 21.

The first disk 1 is in fact a cartridge/disk combination including a disk main body 1A rotatably contained in a cartridge 1B having a rectangular profited as viewed from above. The disk main body 1A has a recording area that is used to reproduce and/or record data by irradiating a blue laser beam.

The cartridge 1B is made of synthetic resin and has a circular central window through which the disk main body 1A is exposed.

The second disk tray 12 is adapted to be mounted by the second disk 2. It is dish-shaped and has a substantially rectangular profile as viewed from above. It has an aperture 12A arranged at the center thereof so that the second disk 2 may be irradiated with a laser beam emitted from the first reproducing/recording mechanism 21 or the second reproducing/recording mechanism 22.

The second disk tray 12 is supported in such a way that it is freely movable along the guide section 11B of the first disk tray 11.

The second disk 2 is a bare disk that is not contained in a cartridge. It comes in as either of two types, one having a recording area adapted to reproduce and/or record data when irradiated with a red laser beam and one having a recording area adapted to reproduce and/or record data when irradiated with a blue laser beam.

As seen from FIG. 2B, the fist disk tray 11 and the second disk tray 12 can be moved into and away from the reproducing/recording apparatus (not shown in FIGS. 2A and 2B) through the; single disk inlet/outlet port 10A at a time as the second disk tray 12 is laid on the first disk tray 11. A locking mechanism 13 is provided to lock the first disk tray 11 and the second disk tray 12 to a state where the latter is laid on the former.

As shown in FIG. 2A, the locking mechanism 13 includes a pair of resilient detent members 11D arranged on the first disk tray 11 and provided at the front ends thereof with respective engaging, projections 11C and a pair of engaging holes 12B cut through the second disk tray 12 and adapted to be engaged respectively with the corresponding engaging projections 11C.

The resilient detent members 11D are produced by cutting the first disk tray 11 and the front ends thereof are biased upward from the planar area of the first disk tray 11. However, when the second disk tray 12 is laid on the first disk tray 11, the resilient detent members 11B are forced back to become flush with the planar area of the first disk tray 11 against the biasing force.

The front ends of the resilient detent members 11D are apt to be respectively abut the corresponding lateral sides of the cartridge 1B of the first disk 1. Thus, it will be appreciated that the resilient detent members 11D operate to align the first disk 1.

Each of the engaging projections 11C has a rear tapered section that allows the second disk tray 12 to be smoothly mounted at a position separated from the front end of the corresponding resilient detent member 11D by a predetermined distance and a front tapered section that allows the engaging projection to be securely engaged with the related engaging hole 12B and is made to show a cross sectional view that is substantially an isosceles triangle. When the second disk tray 12 is pulled and released from the first disk tray 11, the front tapered section of each of the engaging projections 11C abuts the corresponding edge of the related engaging hole 12B so that the front end of the related resilient detent member 11D is forced to come down against its own resiliency and hence the engaging projection 11C is disengaged from the engaging hole 12B.

The engaging projections 11C and engaging holes 12B show a rectangular plan view.

Referring to FIG. 1, the first reproducing/recording mechanism 21 and the second reproducing/recording mechanism 22 are respectively arranged longitudinally at the fore and at the back relative to the disk inlet/outlet port 10A.

The first reproducing/recording mechanism 21 has a traversing, mechanism 50 arranged oppositely relative to the recording area of the first disk 1 and that of the second disk 2 and a clamping mechanism 60 arranged oppositely relative to the traversing mechanism 50 with the first disk 1 interposed between them.

The traversing mechanism 50 is adapted to operate for reproducing data from and recording data to the first disk 1 and the second disk 2 and includes a base section 51 (see FIG. 13), a disk rotating shaft 50A fitted to the base section 51 and a pickup mechanism 50B adapted to irradiate the recording area of the disk with a blue laser beam and read the light reflected from the recording area of the disk. Note that the traversing mechanism 50 is provided with switches (not shown) for acquiring information telling; if the first disk 1 is ready for writing data or not. The switches are provided with a sensor section for pushing up the first disk 1.

The second reproducing/recording mechanism 22 has a traversing mechanism 52 arranged oppositely relative to the recording area of the second disk 2 and a holding member (not shown) arranged oppositely relative to the traversing mechanism 52 with the second disk 2 interposed between them and adapted to hold the second disk 2.

The traversing mechanism 52 includes a base section 53 (see FIG. 13), a disk rotating shaft 52A fitted to the base section 53 and a pickup mechanism 52B adapted to irradiate the recording area of the disk with a red laser beam and read the light reflected from the recording area of the disk.

FIGS. 3 through 8 illustrate the configuration of the clamping mechanism 60 of the first reproducing/recording mechanism 21 in detail.

Figure 3:
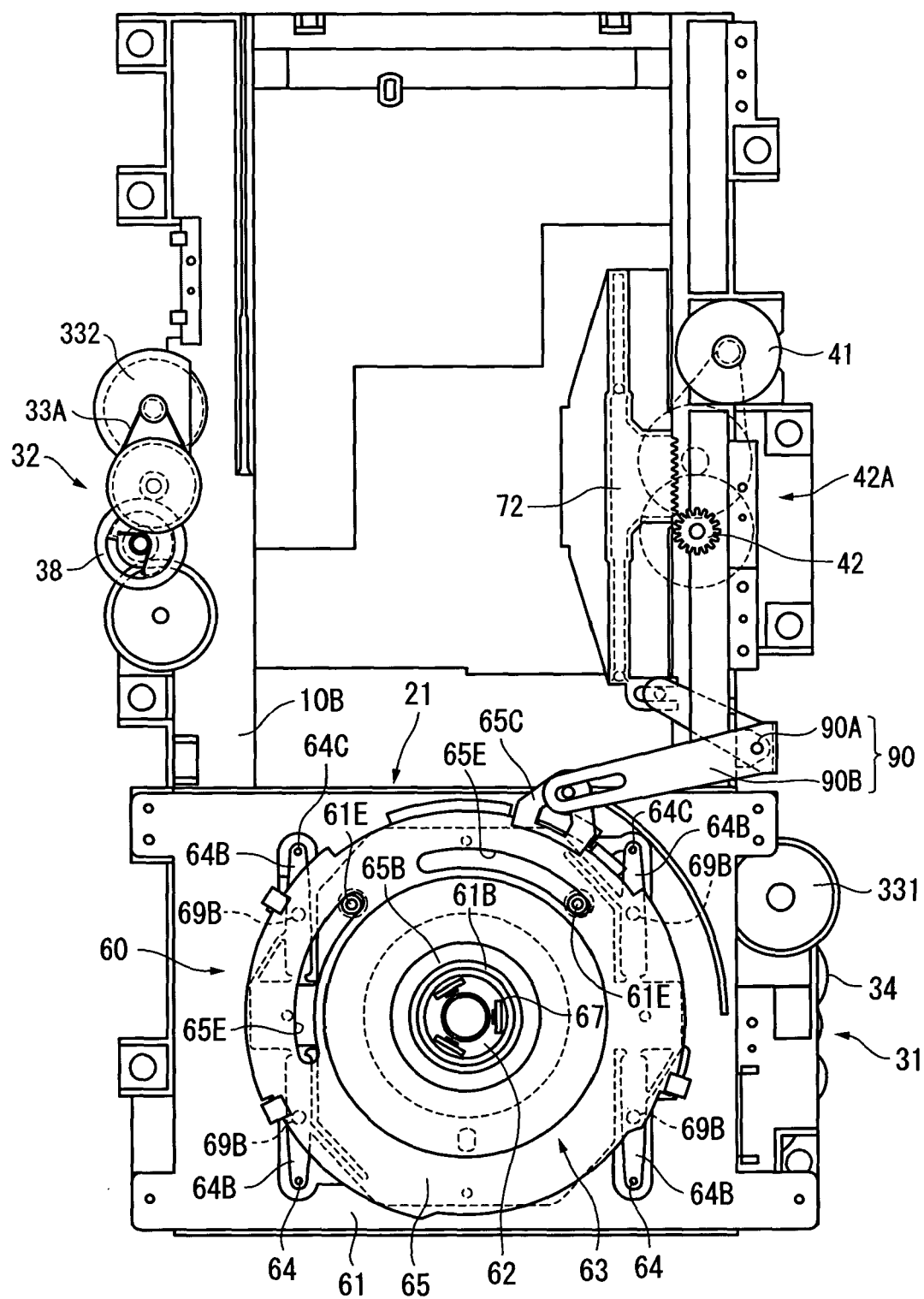
FIG. 3 is a plan view illustrating the overall configuration of a clamping mechanism.
Figure 4:
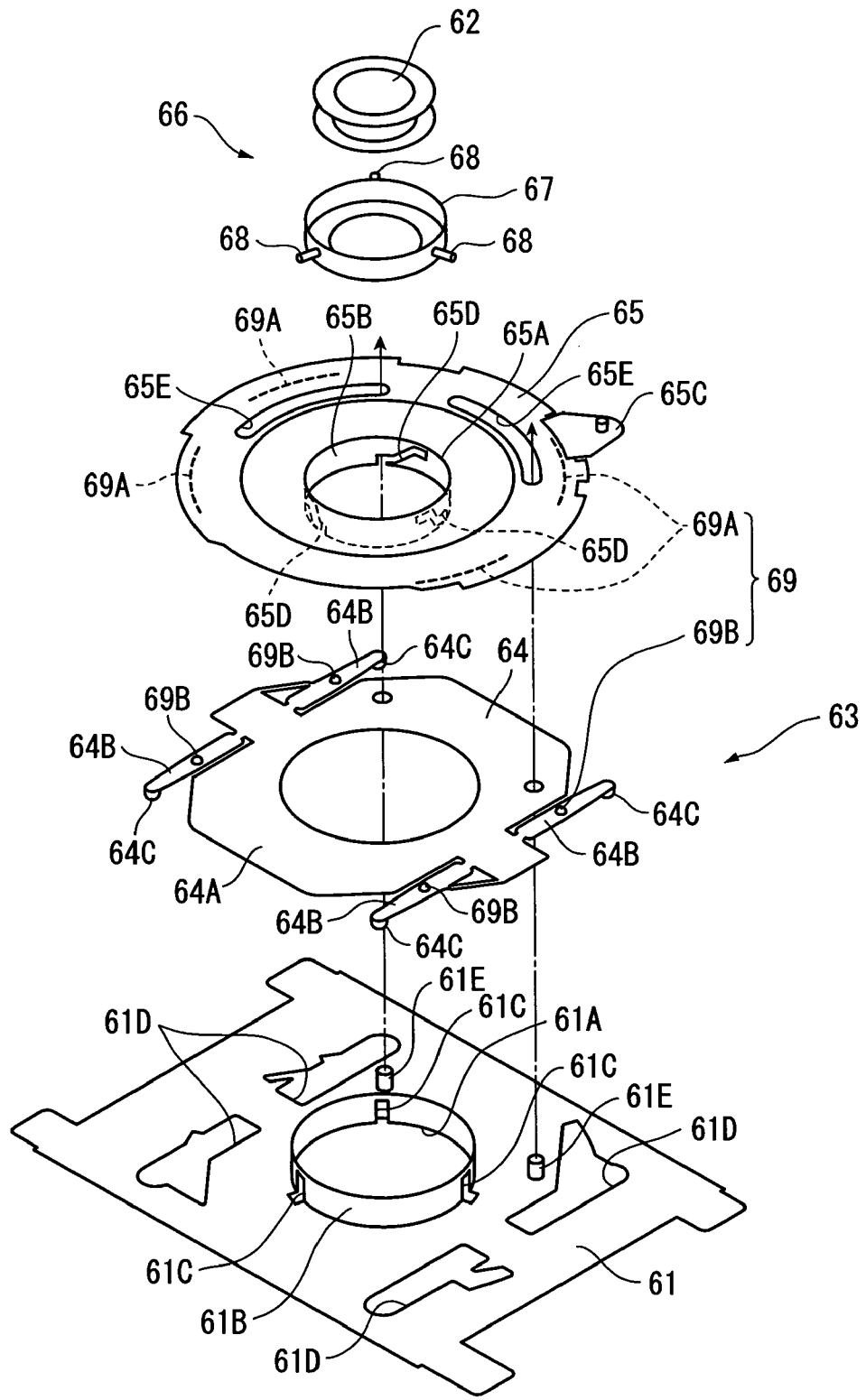
FIG. 4 is an exploded perspective view of the clamping mechanism.
Figure 5:
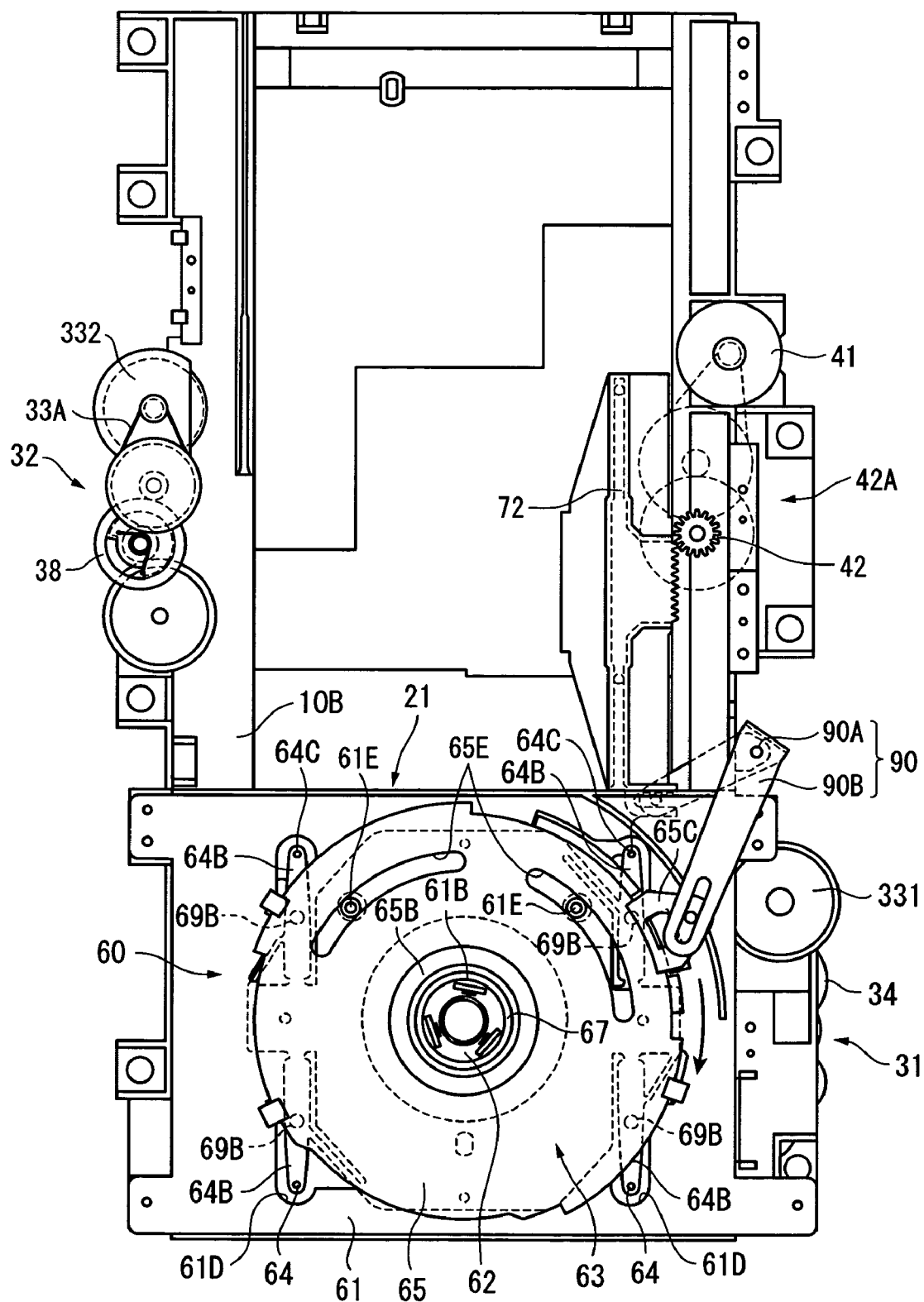
FIG. 5 is a plan view illustrating the overall configuration of the clamping mechanism when a disk member is turned from the position of FIG. 3.

FIGS. 3 and 4 illustrate the overall configuration of the clamping mechanism 60.

Referring to FIGS. 3 and 4, the clamping mechanism 60 includes a main body 61 rigidly fitted to the frame 10B, a clamper 62 arranged on the main body 61 to operate as holding section for holding the second disk 2, a back and forth moving mechanism 63 adapted to move the clamper 62 toward and away from the first disk tray 11 and a keep member 64 for biasing the first disk 1 toward the first disk tray 11 against the biasing force of the sensor section.

The main body 61 is provided with a circular aperture section 61A located opposite to the first disk 1 when the latter is placed in position, a cylinder section 61B standing upward from the periphery of the aperture section 61A and a pair of engaging pins 61E standing upward from respective positions that are separated from the cylinder section 61B. The main body 61 is formed as integral entity by using synthetic resin.

The clamper 62 is a substantially cylinder member made of synthetic resin.

The back and forth moving mechanism 63 includes a disk member 65 rotatably arranged on the main body 61 and a lift mechanism 66 that raises and lowers the clamper 62 as the disk member 65 is turned.

The disk member 65 has a central circular aperture 65A at a position corresponding to the aperture 61A and a cylinder section 65B projecting downward from the periphery of the circular aperture 65A. The disk member 65 is provided at the outer peripheral edge thereof with an engaging section 65C. The disk member 65 is formed as integral entity by using synthetic resin.

The cylinder section 65B of the disk member 65 is adapted to be snugly put into the cylinder section 61B of the main body 61. The engaging pins 61E of the main body 61 are guided for movement respectively by guide slots 65E having a profile of circular arc and cut through the disk member 65. Thus, the disk member 65 can turn relative to the main body 61 (see FIG. 5).

The lift mechanism 66 is provided with a cylinder member 67 adapted to hold the clamper 62 and three engaging pins 68 projecting outward from the outer peripheral surface of the cylinder member 67.

The engaging pins 68 are held in engagement respectively with vertical engaging slots 61C formed through the cylinder section 61B of the main body 61 and inclined engaging slots 65D formed through the cylinder section 65B of the disk member 65 so that the clamper 62 is raised and lowered as the disk member 65 is turned relative to the main body 61.

The distance by which the clamper 62 is raised (distance of separation) is defined by the vertical distance of the engaging slots 61C and 65D cut respectively through the main body 61 and the disk member 65, although it needs to be sufficiently large to allow the second disk tray 12 to move between the disk inlet/outlet port 10A and the second reproducing/recording mechanism 22.

The keep member 64 is pinched between the main body 61 and the disk member 65 and provided with four arms 64B formed by cutting a resilient metal plate 64A and four abutting sections 64C formed at the front ends of the respective arms 64B.

The four arms 64B are exposed to the first disk 1 through the respective windows 61D cut through the main body 61 and the four abutting sections 64C are apt to abut the top surface of the cartridge 1B at the four respective corners of the latter with predetermined biasing force.

The keep members 64 are provided at the center thereof with a circular hole cut through it to avoid interference with the cylinder sections 61B and 65B.

The clamping mechanism 60 is further provided with a synchronizing mechanism 69 adapted to synchronize the operation of the back and forth moving mechanism 63 for forwardly moving the clamper 62 toward the first disk 1 and the operation of the keep member 64 for biasing the first disk 1.

The synchronizing mechanism 69 includes four cam sections 69A formed on the lower surface of the disk member 65 along the outer periphery thereof and having a profile of circular arc and projections 69B formed on the respective arms 64B and adapted to respectively abut the corresponding cam sections 69A. Thus, as the disk member 65 is turned in a sense to advance the clamper 62, the cam sections 69A that are formed on the lower surface of the disk member 65 and have a profile of circular arc bias the respective arms 64B toward the first disk 1 by way of the respective projections 69B.

Figure 6:
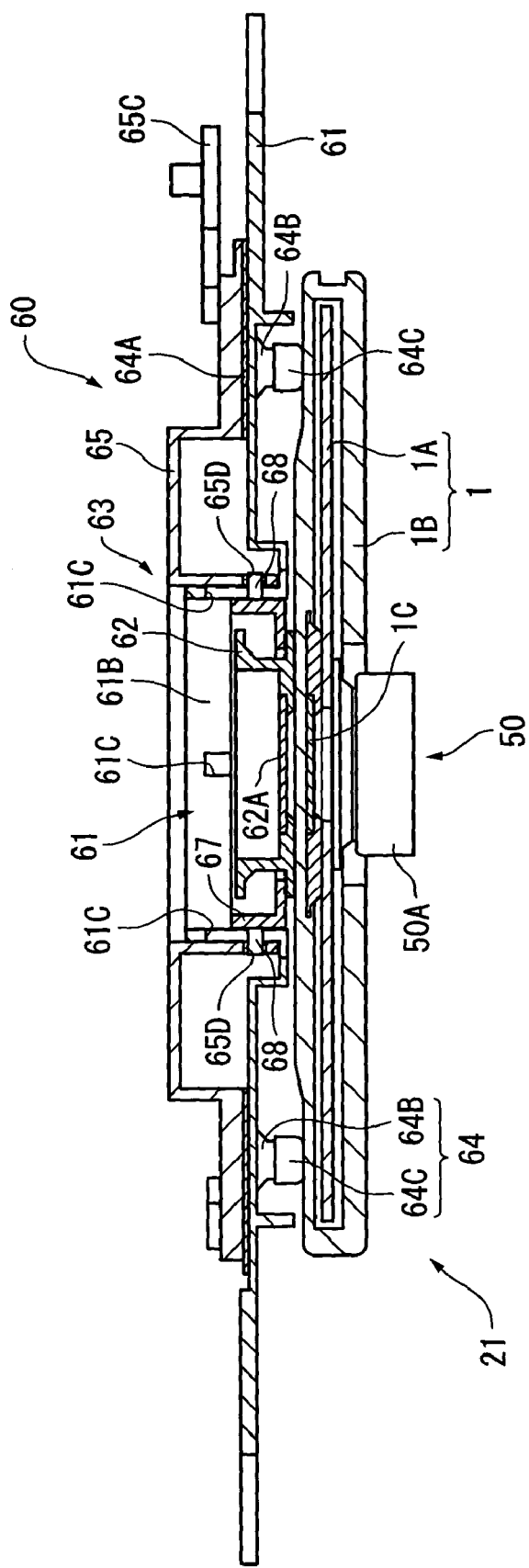
FIG. 6 is a cross sectional view of the clamping mechanism when the first disk is clamped by it.
Figure 7:
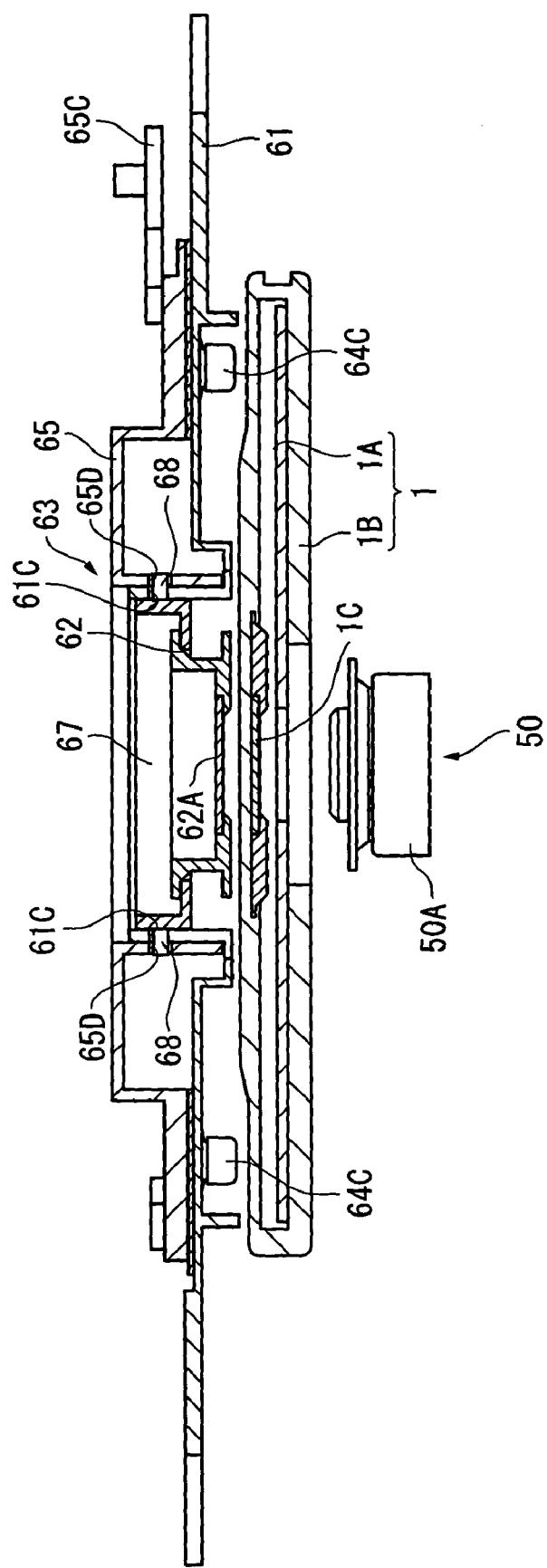
FIG. 7 is a cross sectional view of the clamping mechanism when the first disk is released from it.
Figure 8:
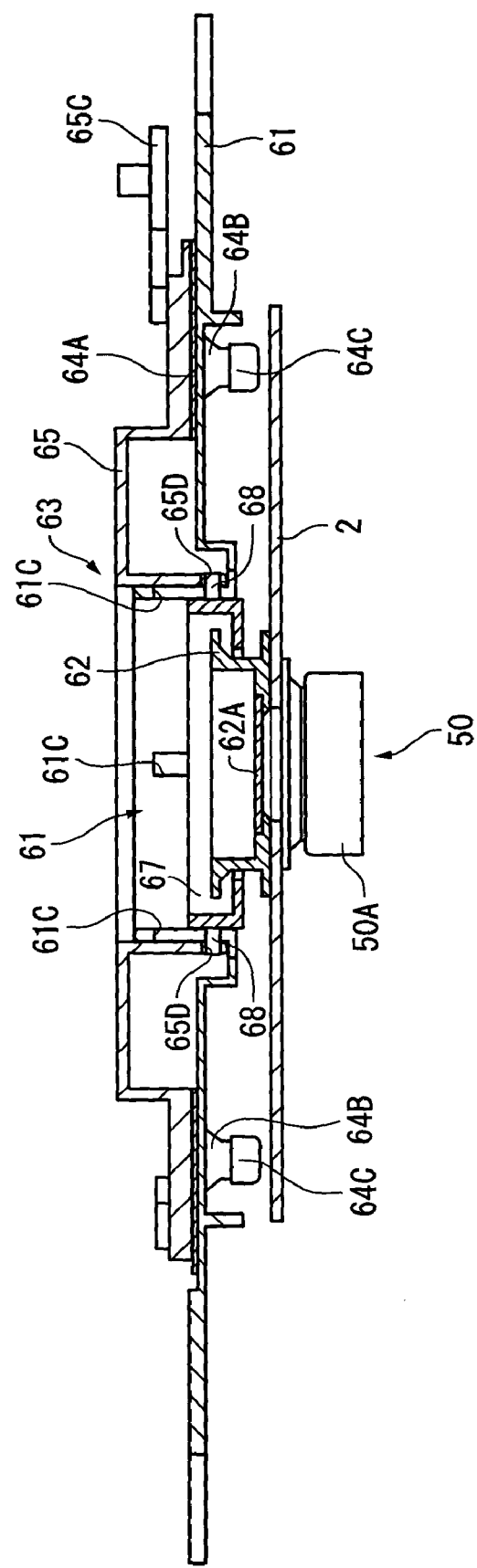
FIG. 8 is a cross sectional view of the clamping mechanism when the second disk is clamped by it.

FIGS. 6 through 8 schematically show cross sectional views of the clamping mechanism 60.

FIG. 6 illustrates the first disk 1 that is clamped by the clamping mechanism 60. In FIG. 6, the cylinder member 67 of the back and forth moving mechanism 63 is located at the lowest position it can take and, under this condition, the clamper 62 is mounted on the clamper 1C that is arranged at the center of the cartridge 1B of the first disk 1, while front ends of the arms 64B are directed downward against the biasing force so that the abutting sections 64C press the top surface of the cartridge 1B at the corresponding corners thereof.

Since the traversing mechanism 50 is located at the high position under this condition, the disk rotating shaft 50A supports the center of the disk main body 1A.

In FIG. 7, the first disk 1 is unclamped. More specifically, in FIG. 7, the cylinder member 67 of the back and forth moving mechanism 63 is located at the highest position it can take and, under this condition, the clamper 62 is separated from the center of the cartridge 1B of the first disk 1, while the front ends of the arms 64B are directed upward by the biasing force so that the abutting sections 64C are separated from the four corners of the top surface of the cartridge 1B.

Since the traversing mechanism 50 is located at the low position under this condition, the disk rotating shaft 50A is separated from the center of the disk main body 1A so that the first disk 1 can be moved out from the apparatus with the first disk tray 11 that is not shown in FIG. 6. –In FIG. 8, the second disk 2 is clamped. More specifically, in FIG. 8, the cylinder member 67 of the back and forth moving mechanism 63 is located at the lowest position it can take and, under this condition, the clamper 62 is mounted on the center of the second disk 2. Although the front ends of the arms 64B are directed downward against the biasing force, the abutting sections 64C are separated from the second disk 2.

Since the traversing mechanism 50 is located at the high position under this condition, the disk rotating shaft 50A supports the center of the second disk 2. The second disk 2 is held in position by the clamper 62 because the latter is provided with an iron plate 62A, which is adsorbed by a magnet (not shown) arranged on the disk rotating shaft 50A.

FIGS. 9 through 15 illustrate a specific configuration of the first tray driving mechanism 31 and that of the second tray driving mechanism 32. Note that the clamping mechanism 60 is omitted from these figures for the purpose of simplicity.

Figure 9:
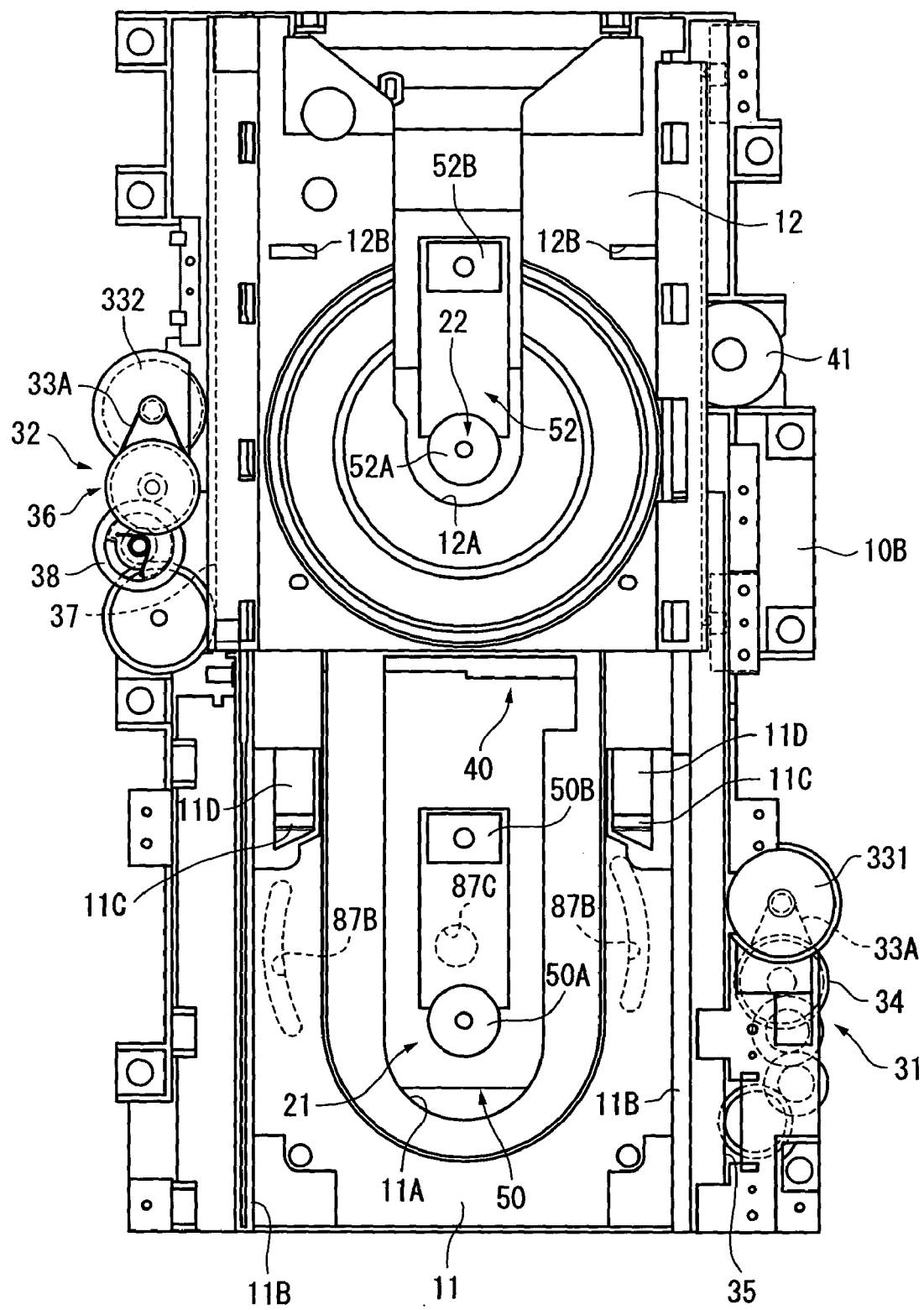
FIG. 9 is a plan view of a first tray driving mechanism and a second tray driving mechanism.
Figure 10:
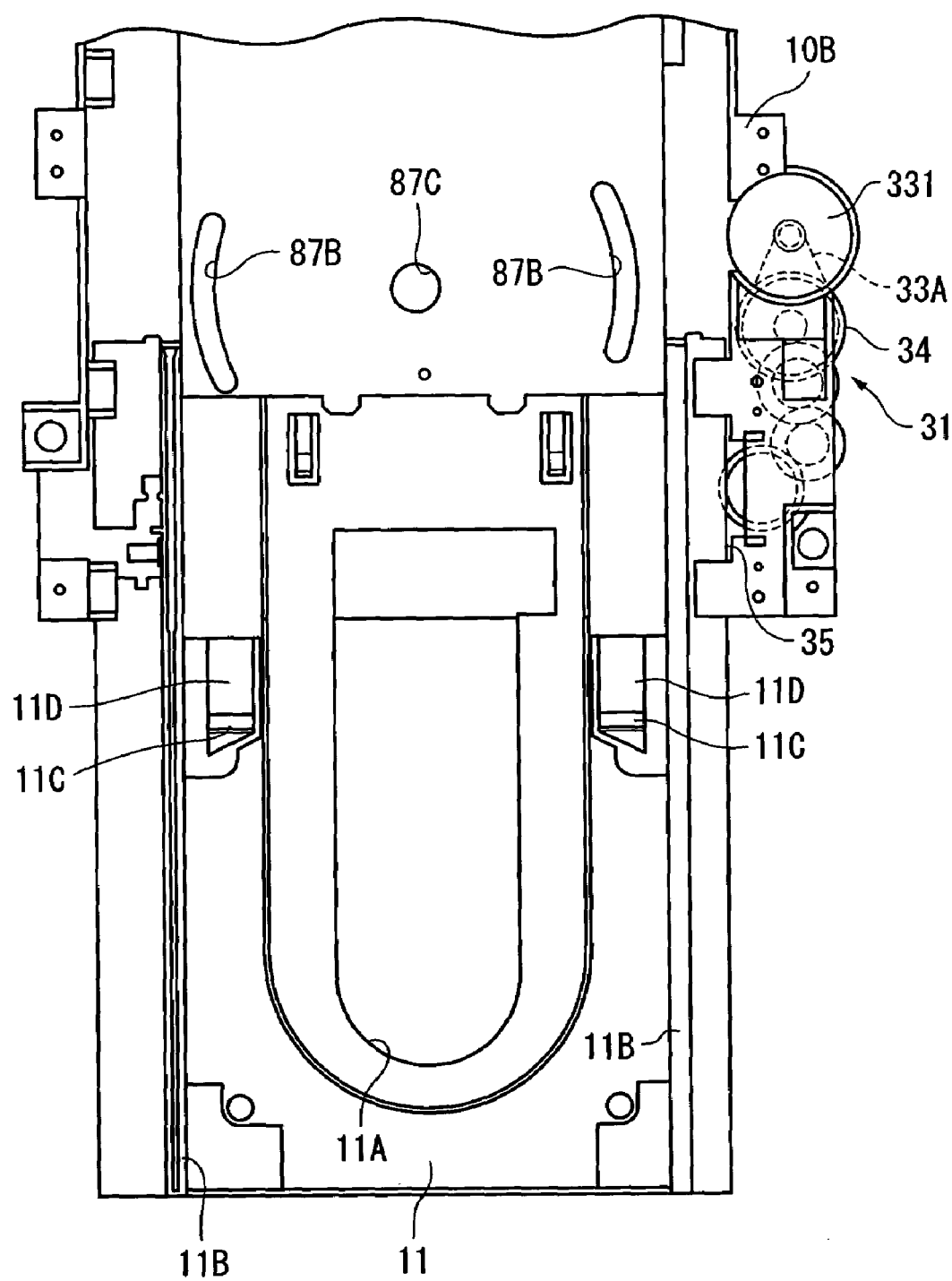
FIG. 10 is a plan view of the first tray driving mechanism, driving the first disk tray to advance toward a disk inlet/outlet port.

FIG. 9 illustrates the overall configuration of the first tray driving mechanism 31 and that of the second tray driving mechanism 32.

Referring to FIG. 9, the first tray driving mechanism 31 includes a tray driving motor 331 that operates as drive source, a first gear unit 34 linked to the tray driving motor 331 and a first tray rack 35 held in engagement with the first gear unit 34 and arranged at a lateral side of the first disk tray 11 along the moving direction of the latter.

The first gear unit 34 includes a number of gears and linked to the tray driving motor 331 by way of a belt 33A. As the tray driving motor 331 is driven to rotate in the positive sense, its rotary motion is transmitted to the first tray rack 35 by way of the first gear unit 34 and the first disk tray 11 carrying the first tray rack 35 is moved to the outside through the disk inlet/outlet port 10A (see FIG. 10). On the other hand, as the tray driving motor 331 is driven to rotate in the negative sense, its rotary motion is transmitted to the first gear unit 34 and the first tray rack 35 and the first disk tray 11 is moved to the inside through the disk inlet/outlet port 10A.

Referring to FIG. 9, the second tray driving mechanism 32 includes a tray driving motor 332, a second gear unit 36 linked to the tray driving motor 332 by way of the belt 33A and a second tray rack 37 held in engagement with the second gear unit 36 and arranged at a lateral side of the second disk tray 12. The second tray rack 37 is arranged along the moving direction of the second disk tray 12.

Figure 11:
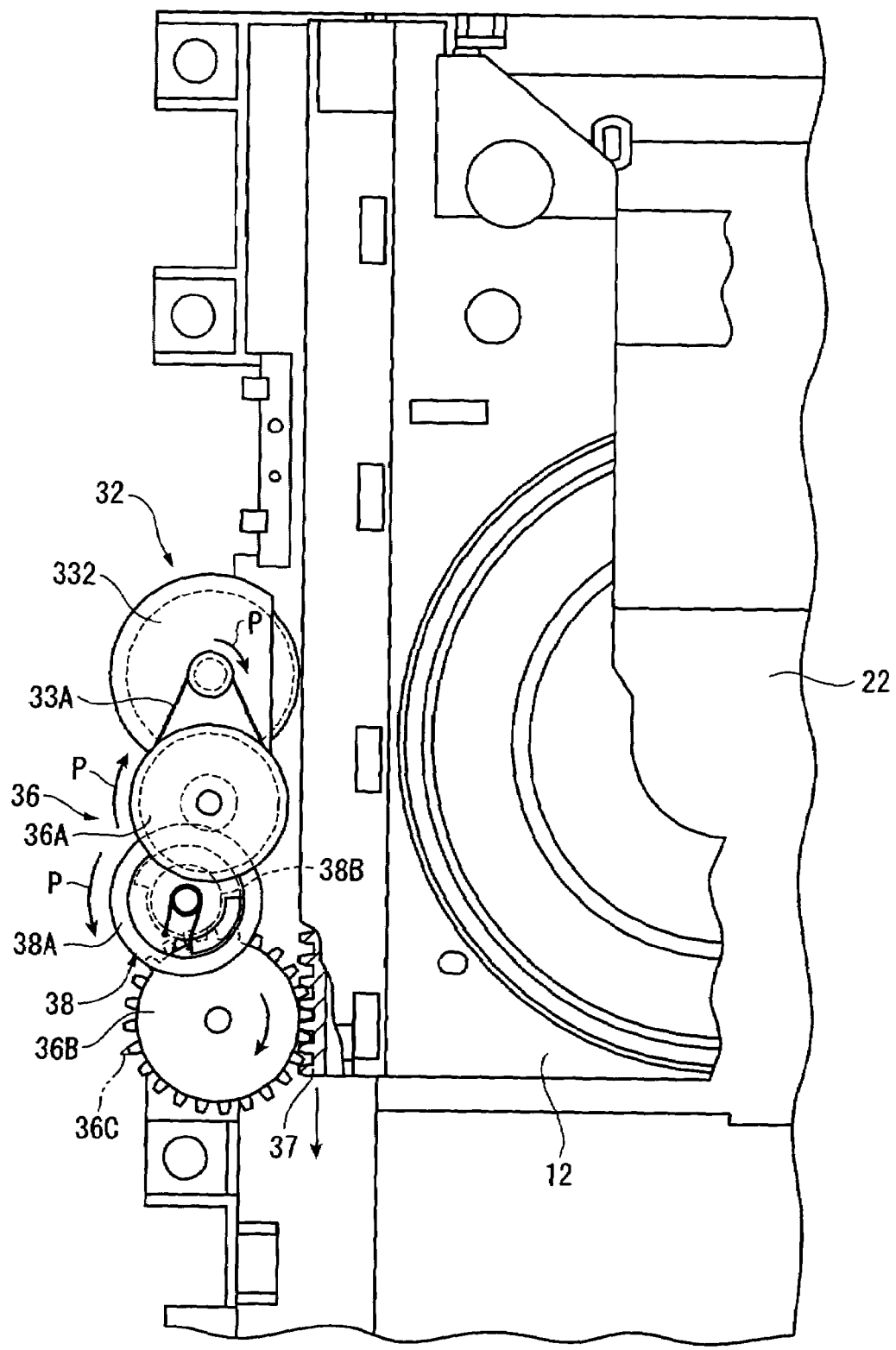
FIG. 11 is a plan view of the second tray driving mechanism.

As shown in FIG. 11, as the tray driving motor 332 is driven to rotate in the positive sense P, its rotary motion is transmitted to the second tray rack 37 by way of the second gear unit 36 and the second disk tray 12 carrying the second tray rack 37 is driven to move toward the disk inlet/outlet port 10A.

The second gear unit 36 includes a loosing mechanism 38 to be used for separating the second tray rack 37 from the second gear unit 36 without load when moving the first disk tray 11 to the disk inlet/outlet port 10A with the second disk tray 12 laid thereon, a motor side gear 36A belonging to the loosing mechanism 38 and a second rack side gear 36B also belonging to the loosing mechanism 38. The second rack side gear 36B is brought into engagement with the second tray rack 37.

In this embodiment, the front ends of the teeth of the second rack side gear 36B may be made to show an acute angle as indicated by a phantom line 36C so that the second rack side gear 36B may be smoothly brought into engagement with the second tray rack 37.

Figure 12A:
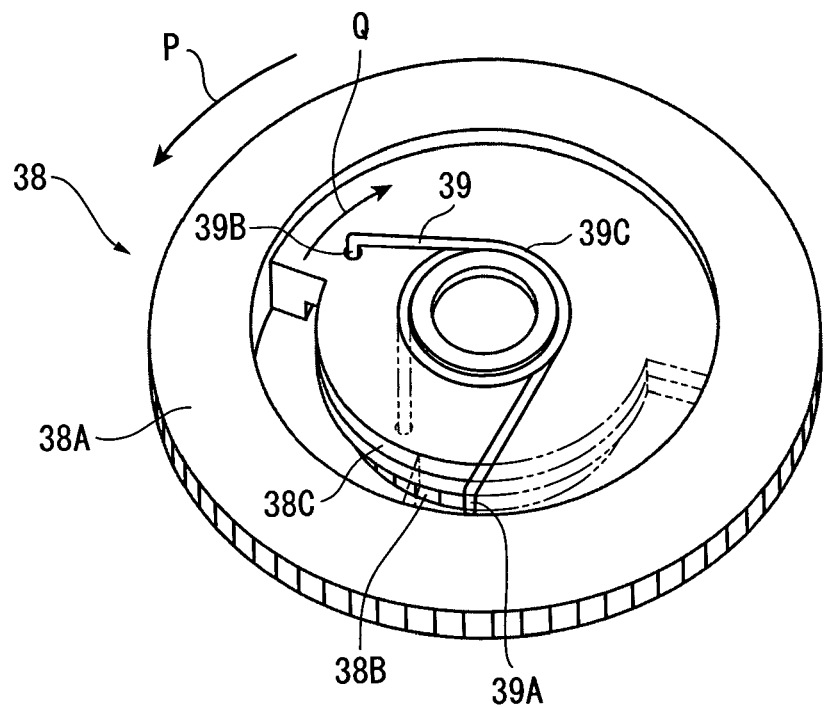
FIGS. 12A and 12B are perspective views of a loosely driving mechanism.
Figure 12B:
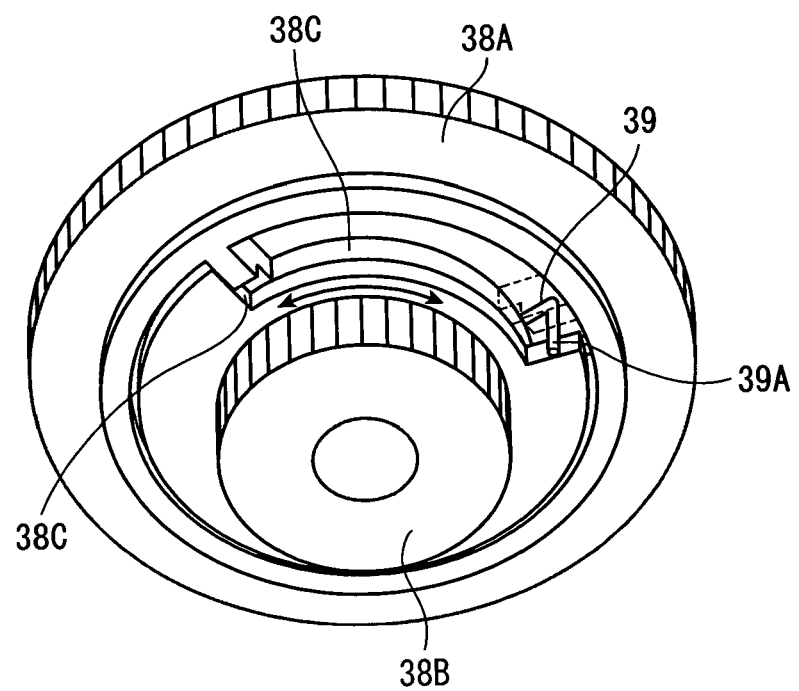

FIGS. 12A and 12B specifically illustrate the configuration of the loosing mechanism 38.

Referring to FIGS. 11, 12A and 12B, the loosing mechanism 38 includes a base gear 38A to be engaged with the motor side gear 36A, an idle gear 38B arranged coaxially with the base gear 38A so as to be engaged with the second rack side gear 36B and rotatable relative to the base gear 38A, and a biasing member 39 for biasing the idle gear 38B in the sense of rotation P of the base gear 38A when moving the first disk tray 11 toward the disk inlet/outlet port 10A.

The base gear 38A and the idle gear 38B are provided respectively with peripherally extending grooves 38C that have a predetermined length and show a profile of circular arc.

The biasing member 39 is in fact a coil spring that has an end 39A engaged with the groove 38C of the idle gear 38B having a profile of circular arc, another end 39B engaged with the base gear 38A and a central ring-shaped section 39C engaged with the rotary shaft of the base gear 38A and the idle gear 38B. The biasing member 39 is compressed between the opposite ends thereof when the base gear 38A and the idle gear 38B are driven to rotate in the sense of P in order to move the first disk tray 11 toward the disk inlet/outlet port 10A (see the phantom lines in FIGS. 12A and 12B), whereas it is extended between the opposite ends thereof when the rotary motion of the base gear 38A is suspended and the idle gear 38B is made to rotate idly in the sense of P (see the solid lines in FIGS. 12A and 12B).

Figure 14:
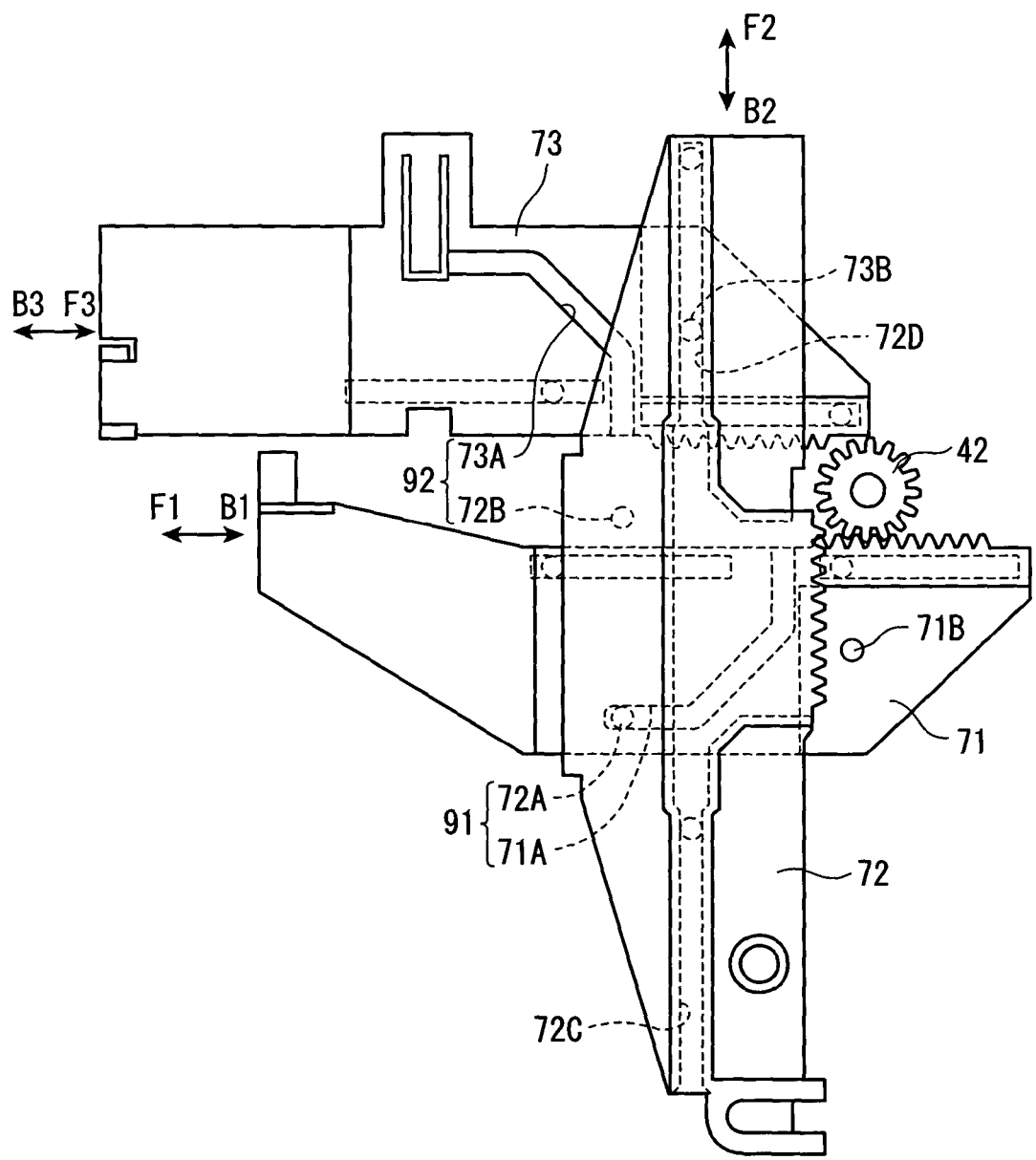
FIG. 14 is a plan view illustrating a primary portion of the 4-position shifting mechanism.

FIGS. 13 and 14 illustrate the configuration of the 4-position shifting mechanism 40.

Referring to FIG. 13 illustrating the overall configuration, the 4-position shifting mechanism 40 is adapted to shift the first reproducing/recording mechanism 21 and the second reproducing/recording mechanism 22 respectively between the first positions and the second positions, using a total of four positions.

The base section 51 of the first reproducing/recording mechanism 21 is fitted to the frame 10B in such a way that it is vertically movable. In this embodiment, position UP located close to the clamping mechanism 60 is the first position of the first reproducing/recording mechanism 21, whereas position DOWN located remote from the clamping mechanism 60 is the second position.

The base section 53 of the second reproducing/recording mechanism 22 is fitted to the frame 10B in such a way that it can swing freely around pivot pin 53A arranged at the back side of the base section 53. In this embodiment, position UP to which the base section 53 is raised is the first position, whereas position DOWN to which the base section 53 is lowered is the second position.

The 4-position shifting mechanism 40 includes a motor 41 that operates as a drive source, a pinion 42 linked to the motor 41 by way of a gear unit 42A, first, second and third racks 71, 72 and 73 engaged with the pinion 42, a first cam mechanism 81 linking the first rack 71 and the base section 53 of the second reproducing/recording mechanism 22, a second cam mechanism 82 linking the second rack 72 and the first reproducing/recording mechanism 21, a third cam mechanism 83 linking the third rack 73 and the second reproducing/recording mechanism 22, a first switching mechanism 91 for switching the engagement of the first rack 71 and the pinion 42 to the engagement of the second rack 72 and the pinion 42 and a second switching mechanism 92 for switching the engagement of the second rack 72 and the pinion 42 to the engagement of the third rack 73 and the pinion 42.

The first rack 71 is arranged in such a way that it horizontally advances in direction F1 and retreats in direction B1 that rectangularly intersect the moving directions of the second disk tray 12. It is partly linked to the first cam mechanism 81.

The first cam mechanism 81 includes a first cam member 84 held in such a way that it can freely move back and force relative to the frame 10B in the moving directions of the first rack 71 and a pair of engaging pins 85 arranged at an edge of the base section 53 and engaged with respective cam slots 84A that are cut through the first cam member 84 so that it lowers the base section 53 from the first position to the second position as the first rack 71 advances in the direction F1 and raises the base section 53 from the second position to the first position as the first rack 71 retreats in the direction B1. The first cam member 84 is provided with a pair of lower horizontal slots, a pair of inclined slots communicating with the respective lower horizontal slots and a pair of upper horizontal slots communicating with the respective inclined slots for the purpose of raising and lowering the base section 53.

The second rack 72 is arranged in such a way that it can advance in direction F2 and retreat in direction B2 horizontally along the moving directions of the second disk tray 12. It is partly linked to the second cam mechanism 82.

The second cam mechanism 82 includes a pair of second cam members 86A and 86B held in such a way that they can freely move back and force relative to the frame 10B in the moving directions of the second rack 72, two pairs of engaging pins 85 arranged at the lateral edges of the base section 51 and engaged with respective cam slots 84A that are cut through the second cam members 86A and 86B, and an interlocking mechanism 87 for interlocking the two cam :members 86A and 86B so that it lowers the base section 51 from the first position to the second position as the second rack 72 advances in the direction F2 and raises the base section 51 from the second position to the first position as the second rack 72 retreats in the direction B2.

The second cam members 86A and 86B are oppositely disposed with the base section 51 interposed between them and the pairs of cam slots 84A cut through the second cam members 86A and 86B are symmetrically arranged relative to each other.

The interlocking mechanism 87 includes an arm 87A having its opposite ends thereof linked respectively to the second cam members 86A and 86B and its center 87C rotatably supported by the frame 10B and a pair of slots 87B having a profile of circular arc, along which the opposite ends of the arm 87A are guided.

The second cam member 86A and the disk member 65 are linked to each other by way of a clamping/interlocking mechanism 90 that interlocks them.

The clamping/interlocking mechanism 90 includes a rotary shaft 90A rotatably held by the frame 10B and an angle 90B coupled to the rotary shaft 90A and having an end thereof linked to the engaging section 65C and the opposite end linked to the second cam member 86A.

The third rack 73 is arranged on the frame 10B oppositely relative to the first rack 71 with the pinion 42 interposed between them in such a way that it can advance in the direction F3 and retreats in the direction B3.

The third rack 73 has a part that is linked to the third cam mechanism 83. The third cam mechanism 83 includes the above described first cam member 85 and a tensile spring 88 adapted to bias the first cam member 85 in the direction F1 and is adapted to raise the base section 53 from the second position to the first position as the third rack 73 advances in the direction F3 and lowers the base section 53 from the first position to the second position as the third rack 73 retreats in the direction B3.

As shown in FIG. 14, the first switching mechanism 91 includes a first cam slot 71A cut through the first rack 71 and a first engaging pin 72A having its front end engaged with the first cam slot 71A and its base end secured to the second rack 72. As the first rack 71 advances and gets to a predetermined position, the first cam slot 71A guides the first engaging pin 72A and makes the second rack 72 to be engaged with the pinion 42.

The second switching mechanism 92 includes a second cam slot 73A cut through the third rack 73 and a second engaging pin 72B having its front end engaged with the second cam slot 73A and its base end secured to the second rack 72. As the second rack 72 advances and gets to a predetermined position, the second engaging pin 72B guides the second cam slot 73A and makes the third rack 73 to be engaged with the pinion 42. In FIG. 14, reference symbol 71B denotes a guide pin arranged on the first rack 71 and reference numeral 72C denotes a guide slot cut through the second rack 72 so as to be guided by the guide pin 71B, whereas reference numeral 73B denotes a guide pin arranged on the third rack 73 and reference numeral 72D denotes a guide slot cut through the second rack 72 so as to be guided by the guide pin 73B.

Now, the operation of this embodiment will be described below.

Firstly, the operation of the first disk tray 11 and that of the second disk tray 12 will be described by referring to FIGS. 15 through 19.

The first disk tray 11 is moved out in order to use the first disk 1 for a reproducing/recording operation. To do this, a predetermined button is depressed to operate the first tray driving mechanism 31. Then, the first disk tray 11 is driven to advance toward the disk inlet/outlet port 10A by the first tray driving mechanism 31 (see FIG. 10).

The first disk 1 is mounted on the first disk tray 11 and the button is depressed again to operate the first tray driving mechanism 31 to return the first disk tray 11 onto the first reproducing/recording mechanism 21. Then, the first reproducing/recording mechanism 21 is operated to reproduce data from or record data on the first disk 1.

The second disk tray 12 is moved out in order to use the second disk 2 for a reproducing/recording operation. To do this, a predetermined button is depressed to operate the second tray driving mechanism 32.

As the tray driving motor 332 of the second tray driving mechanism 32 is driven to rotate in the positive sense, its drive force is transmitted to the second tray rack 37 by way of the second gear unit 36 and, as the second tray rack 37 is driven, the second disk tray 12 advances toward the disk inlet/outlet port 10A.

At this time, since the rotary force of the base gear 38A of the loosing mechanism 38 of the second gear unit 36 is reliably transmitted to the idle gear 38B, the second disk tray 12 is reliably driven to move (see FIG. 11).

Figure 15:
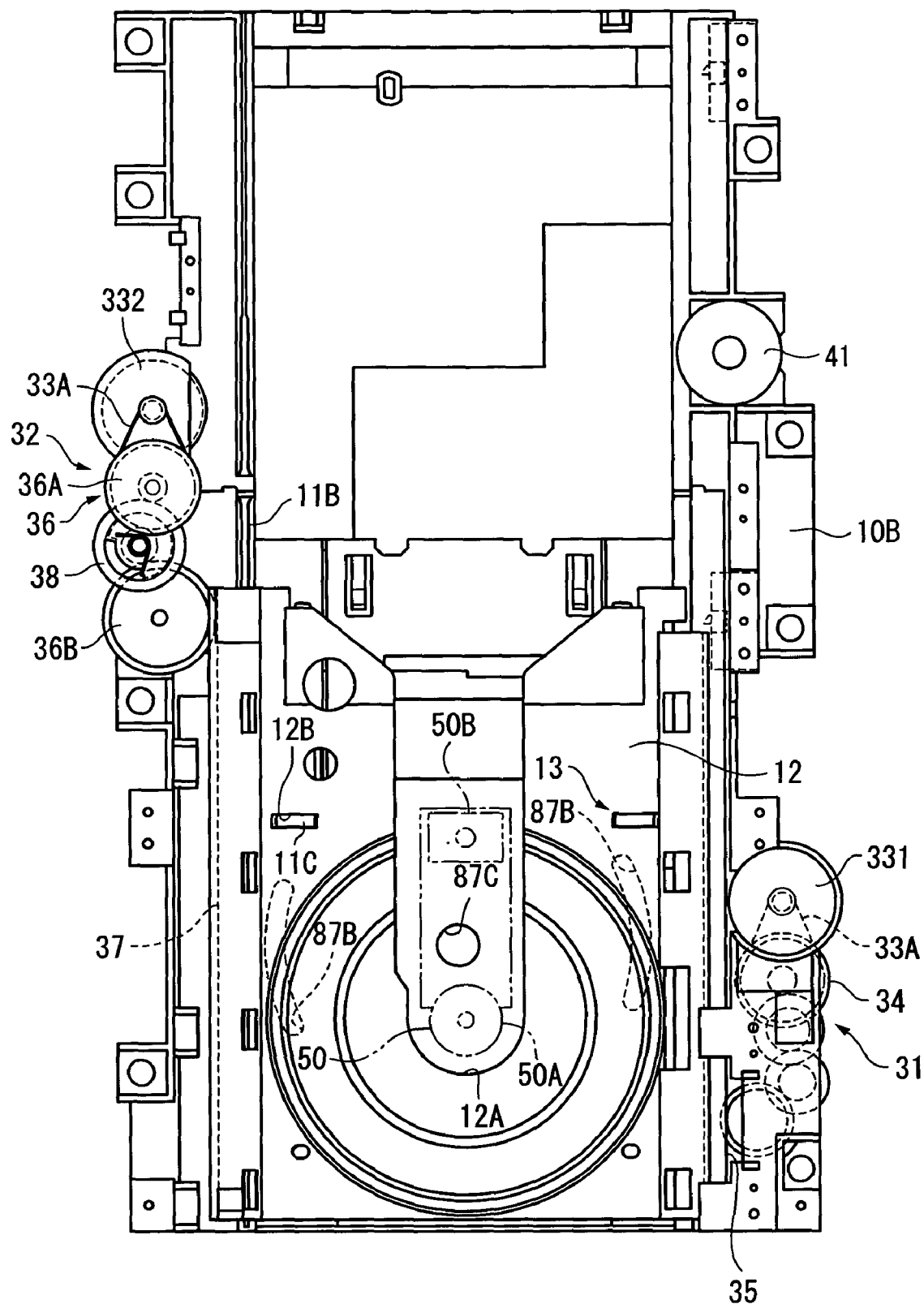
FIG. 15 is a plan view illustrating the operation of the first disk tray and that of the second disk tray.
Figure 16:
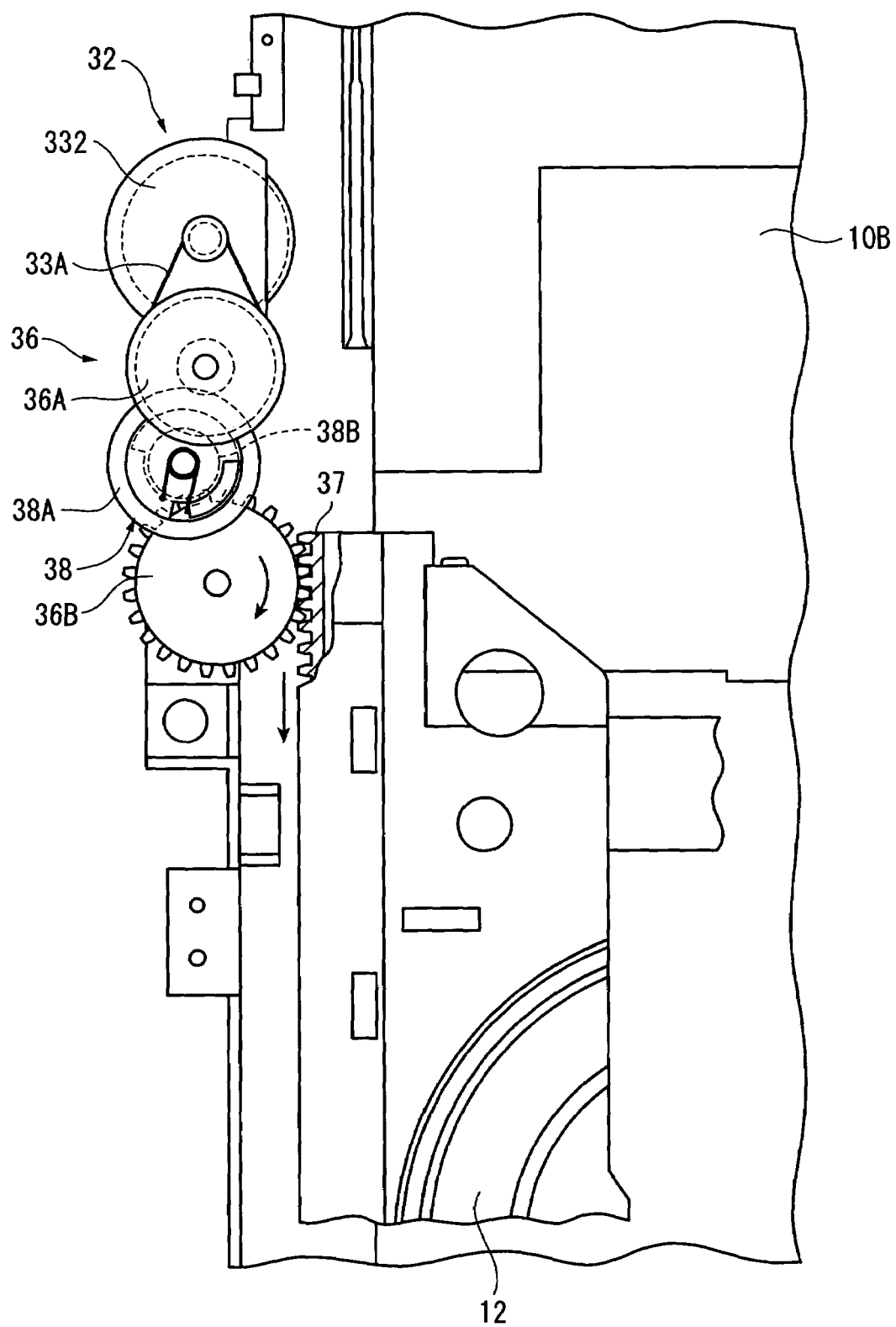
FIG. 16 is a plan view illustrating the operation of the second tray driving mechanism.

As the second disk tray 12 rides on and becomes locked with the first disk tray 11 as shown in FIG. 15, the rotary motion of the tray driving motor 332 of the second tray driving mechanism 32 is stopped but the first tray driving mechanism 31 starts operating to drive the first disk tray 11 that carries the second disk tray 12 thereon to move toward the disk inlet/outlet port 10A as shown in FIG. 16.

Then, the gear 36B engaged with the second tray rack 37 rotates to transmit the rotary force to the loosing mechanism 38 in spite of that the tray driving motor 332 is held to a stopped state. Note that the rotary force is not transmitted to the motor because the idle gear 38B rotates in the biasing direction of the biasing member 39 (idly rotates) in spite of that the base gear 38A at the motor side is held to a stopped state.

Figure 17:
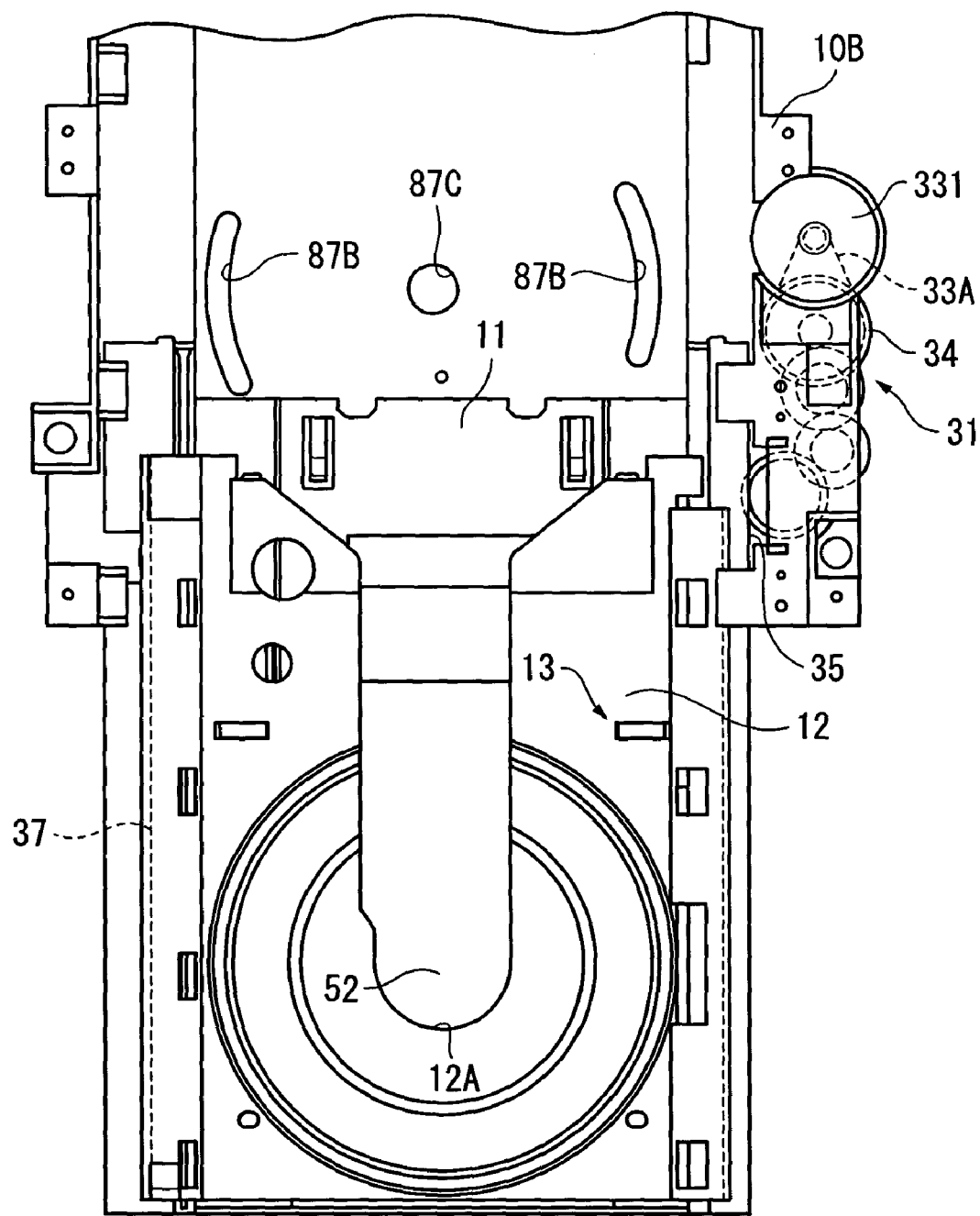
FIG. 17 is a plan view illustrating the operation of the first tray driving mechanism.
Figure 18:
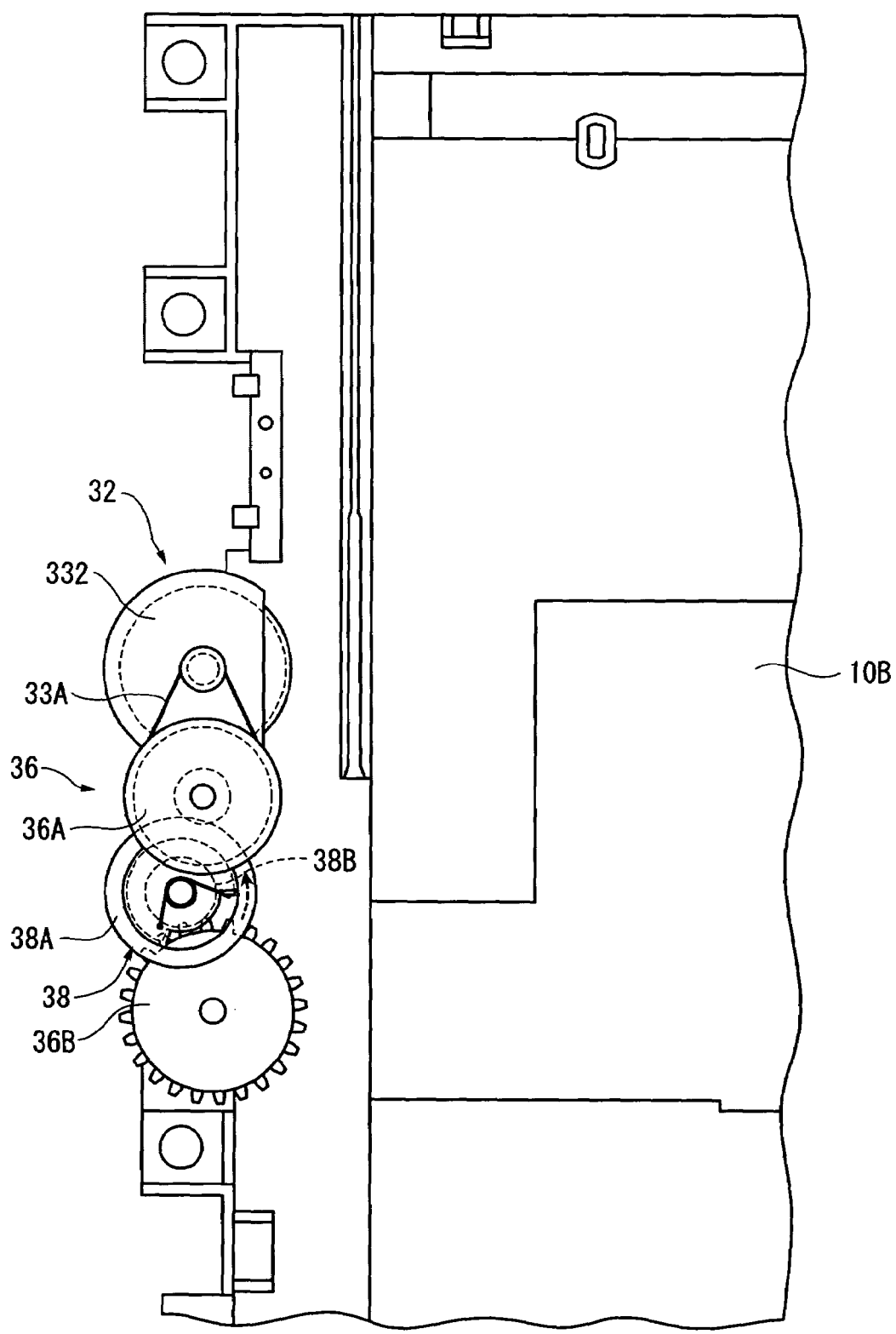
FIG. 18 is a plan view illustrating the operation of the second tray driving mechanism.

Thereafter, since the first tray driving mechanism 31 keeps on operating, the first disk tray 11 and the second disk tray 12 are moved out of the disk inlet/outlet port 10A as shown in FIG. 17. Under this condition, the second tray driving mechanism 32 is disengaged from the second disk tray 12 as shown in FIG. 18. Note that, under this condition, the idle gear 38B is returned to the biased original position by the biasing member 39 relative to the base gear 38A.

Figure 19:
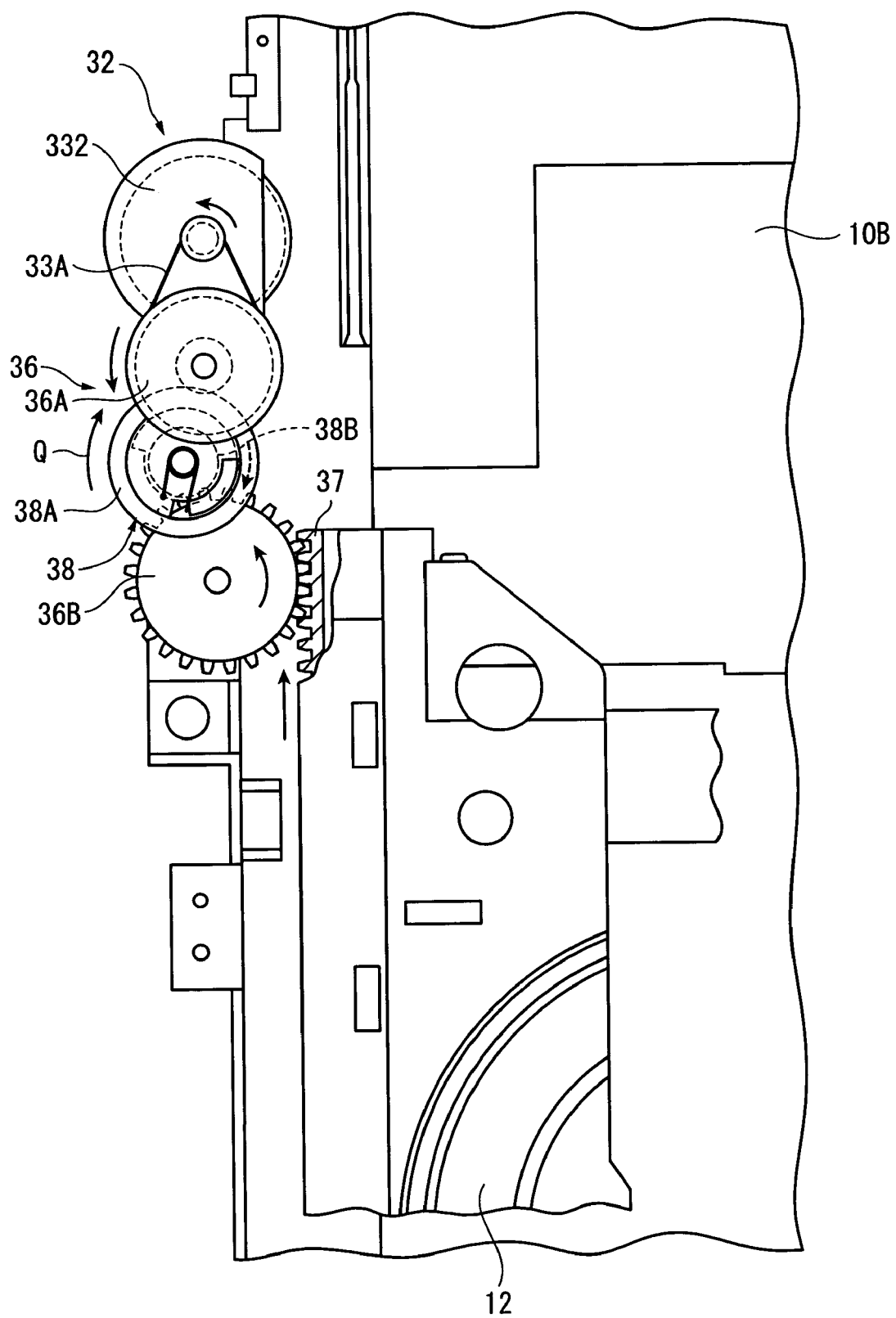
FIG. 19 is a plan view illustrating the operation of the second tray driving mechanism.

As a predetermined button is depressed after mounting the second disk 2 on the second disk tray 12, the second disk tray 12 is moved into the apparatus through the disk inlet/outlet port 10A by the first tray driving mechanism 31. The second tray driving mechanism 32 is driven to operate when the second disk tray 12 is returned to its position in the second reproducing/recording mechanism 21 as shown in FIG. 19. More specifically, the second tray rack 37 arranged on the second disk tray 12 is engaged with the gear 36B of the second gear unit 36. However, since the tray driving motor 332 is driven to rotate in the negative sense, the rotary force of the tray driving motor 332 is transmitted to the second gear unit 36 to drive the second disk tray 12 to return to its proper position.

Here again, since the rotary force in the sense Q that is opposite to the sense P of rotation of the base gear 38A is reliably transmitted to the idle gear 38B, the second disk tray 12 is returned onto the second reproducing/recording mechanism 22 before the latter is driven to operate for reproducing data from or recording data onto the first disk 1.

When driving the second disk 2 for a reproducing/recording operation by means of the first reproducing/recording mechanism 21, the second disk tray 12 is driven to move out of the disk inlet/outlet port 10A with the first disk tray 11 by following the above-described sequence.

Subsequently, the second disk 2 is mounted on the second disk tray 12 and the first tray driving mechanism 31 is operated by depressing the predetermined button in order to drive the second disk tray 12 to move onto the first reproducing/recording mechanism 21 along with the first disk tray 11. Under this condition, the first reproducing/recording mechanism 21 is operated to reproduce data from or record data onto the second disk 2.

Now, the operation of the 4-position shifting mechanism 40 will be described by referring to FIGS. 20 through 28.

FIG. 20 is a timing chart illustrating the components of the 4-position shifting mechanism 40 and their time series positional relationships. The symbols A, B, . . . , I on the horizontal axis of the timing chart indicate timings that respectively agree with the timings of operation as illustrated in FIGS. 21A, 21B, 22C, 22D, 23E, 23F, 24G, 24H and 25I. The 4-position shifting mechanism 40 is operated on the basis of the timing chart.

Firstly, the first reproducing/recording mechanism 21 and the second reproducing/recording mechanism 22 are located high at the respective first positions and ready for reproducing/recording operations.

Under this condition, the first rack 71 is located right and the second rack 72 is located fore, while the third rack 73 is located left in FIG. 13. The angle 90B is located at the initial position of 0 degrees and the disk member 65 of the clamping mechanism 60 is positioned at the predetermined angular position of B where the clamper 62 and the front ends of the keep member 64 are located at respective low positions. Note that the clamper 62 and the cylinder member 67 are located high when the clamper 62 is holding the first disk 1 than when it is holding the second disk 2.

Subsequently, as the pinion 42 is drive to rotate in the positive sense (clockwise), the first rack 71 advances from right to left (in the direction F1) and, as a result, the first cam member 84 also movers from right to left. Under this condition, the second rack 72 and the third rack 73 do not move because they are not engaged with the pinion 42 (see FIG. 21 A).

Figure 21A:
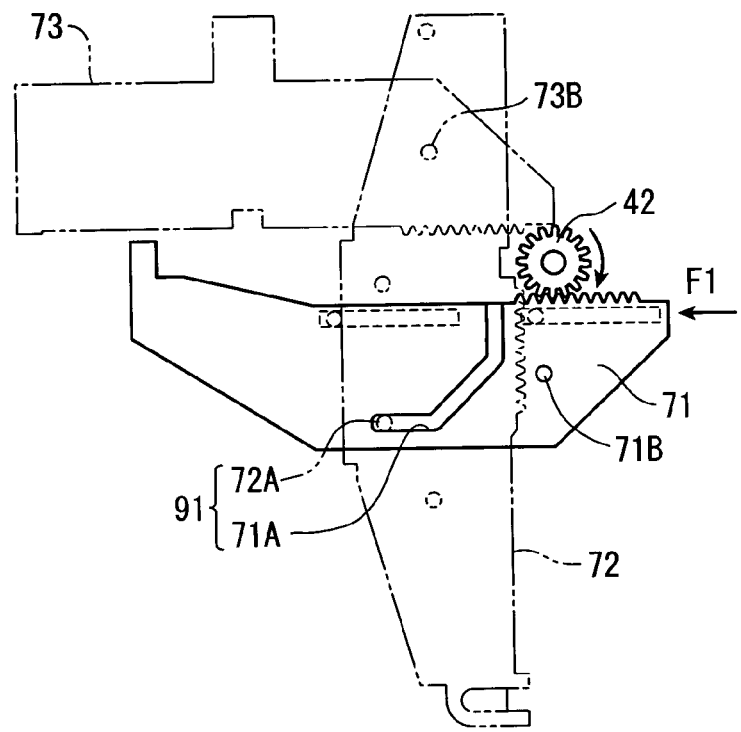
FIGS. 21A and 21B are plan views illustrating a primary portion of the operation of the 4-position shifting mechanism.
Figure 21B:
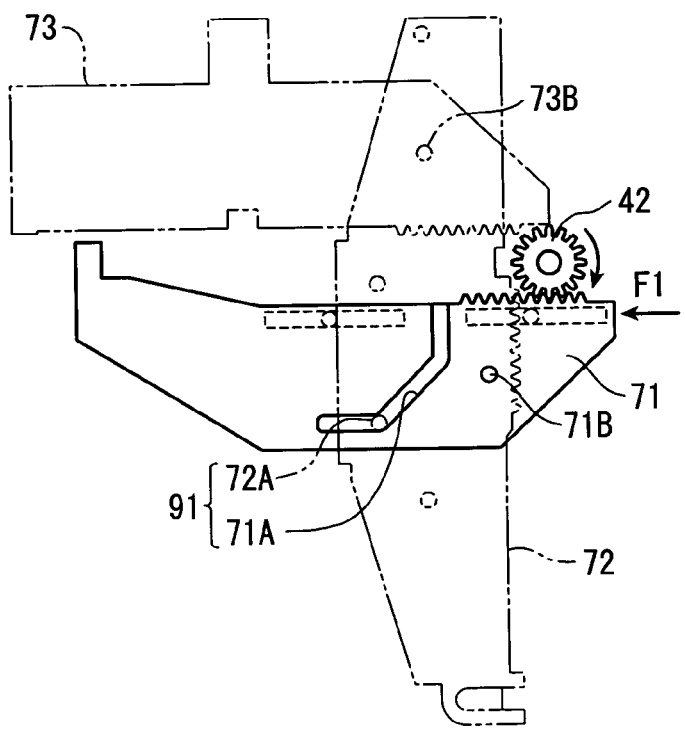
Figure 22C:
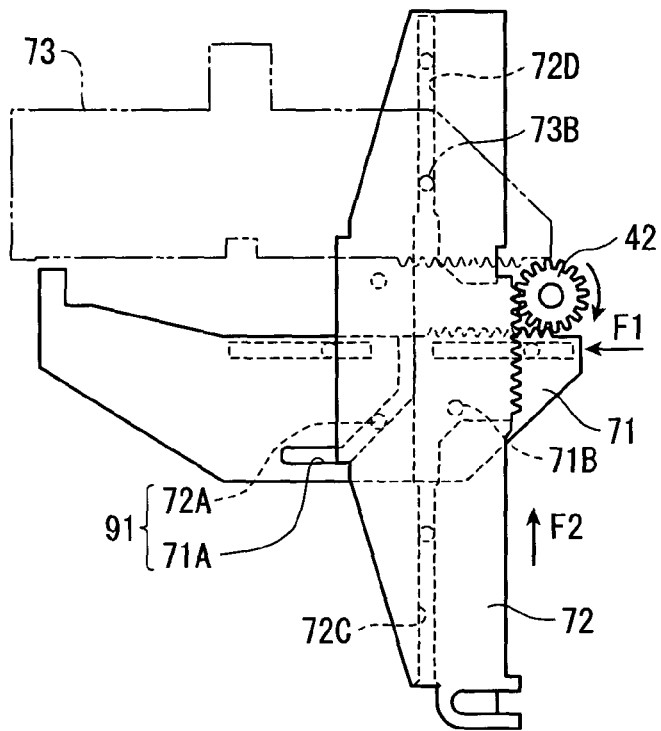
FIGS. 22C and 22D are plan views illustrating a primary portion of the operation of the 4-position shifting mechanism.
Figure 22D:
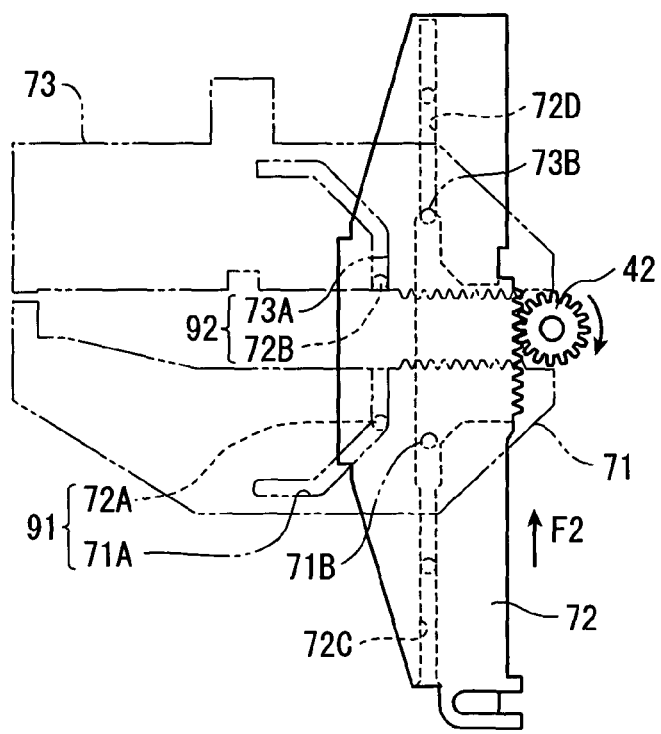

The first switching mechanism 91 is operated to cause the second rack 72 to be engaged with the pinion 42 while the first rack 71 is moving leftward (to advance in the direction F1) (see FIG. 21B). When the pinion 42 keeps on rotating under this condition, the first rack 71 advances leftward (in the direction F1) and, at the same time, the second rack 72 moves from the fore side to the back side (to advance in the direction 172) (see FIGS. 22C and 22D). The second rack 72 keeps on advancing in the direction F2 if the first rack 71 is disengaged from the pinion 42 (see FIG. 23E).

As a result of the leftward movement of the first rack 71 (advancement in the direction F1), the first cam member 84 also moves leftward. Then, as a result of the leftward movement of the first cam member 84, the first cam mechanism 81 starts operating to lower the edges of the base section 53 of the second reproducing/recording mechanism 22 and make the base section 53 take the second position (see FIG. 26).

Figure 23E:
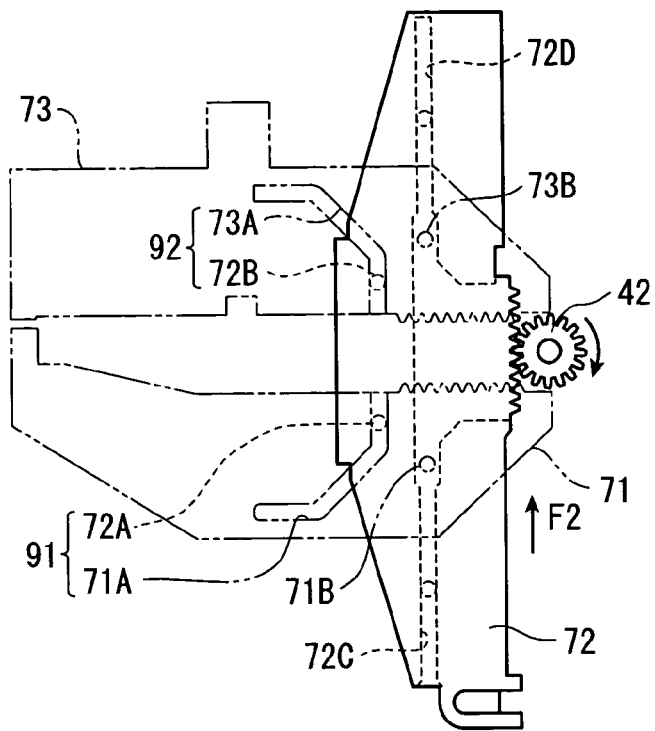
FIGS. 23E and 23F are schematic plan views illustrating a primary portion of the operation of the 4-position shifting mechanism.
Figure 23F:
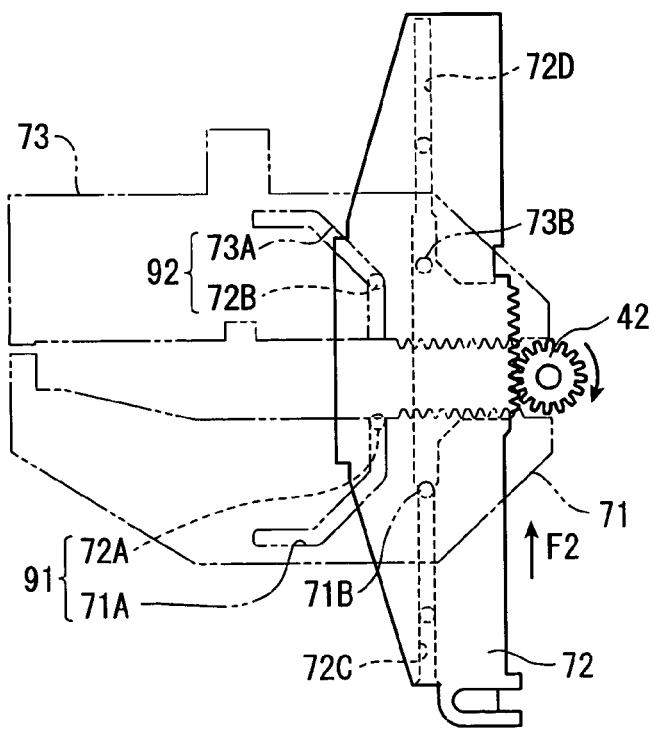
Figure 24G:
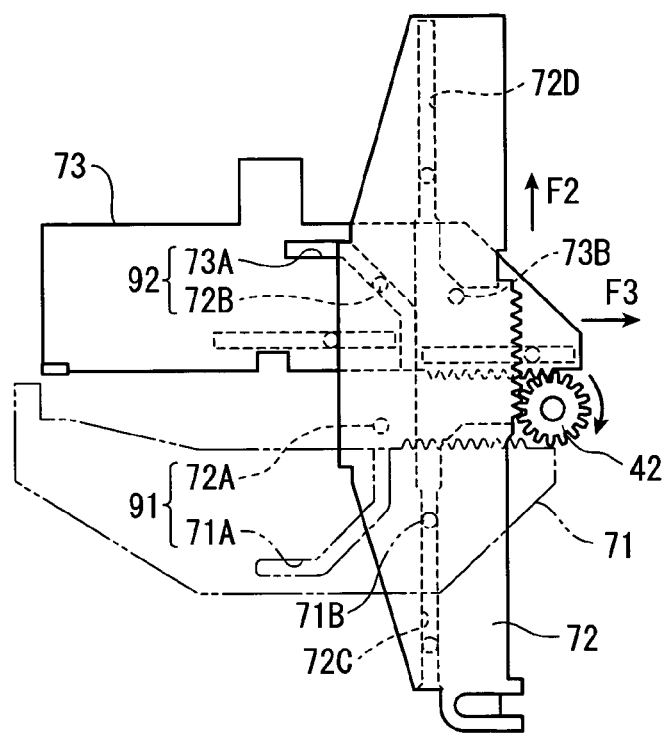
FIGS. 24G and 24H are schematic plan views illustrating a primary portion of the operation of the 4-position shifting mechanism.
Figure 24H:
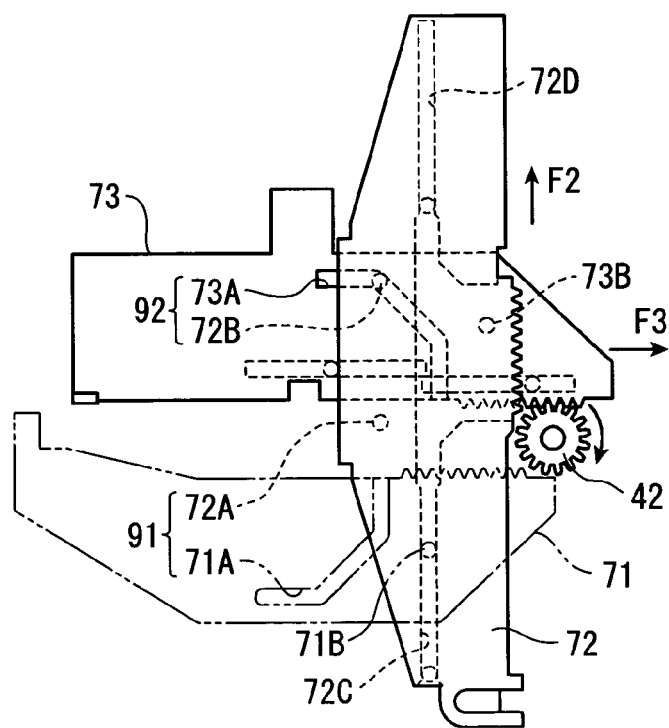
Figure 25I:
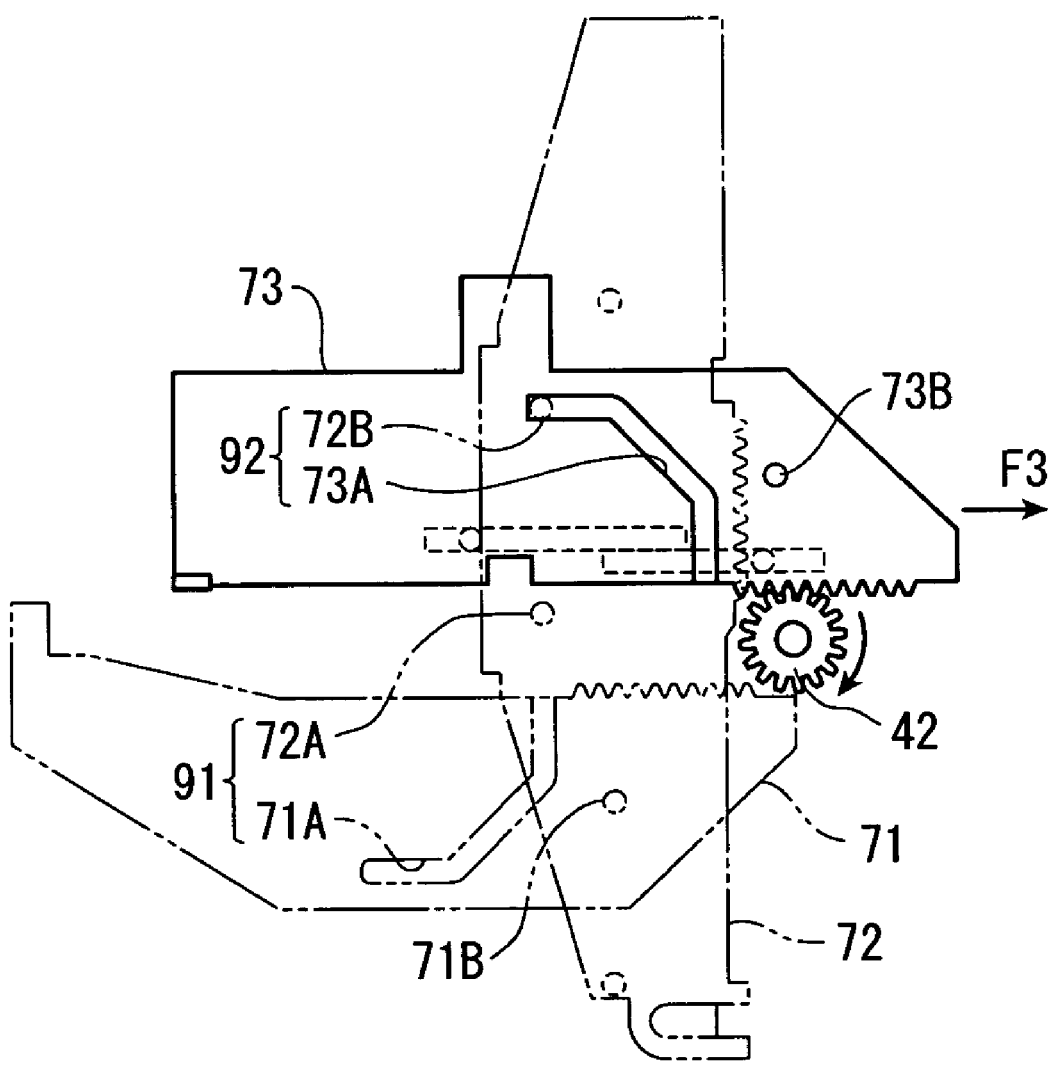
FIG. 25I is a schematic plan view illustrating a primary portion of the operation of the 4-position shifting mechanism.
Figure 26:
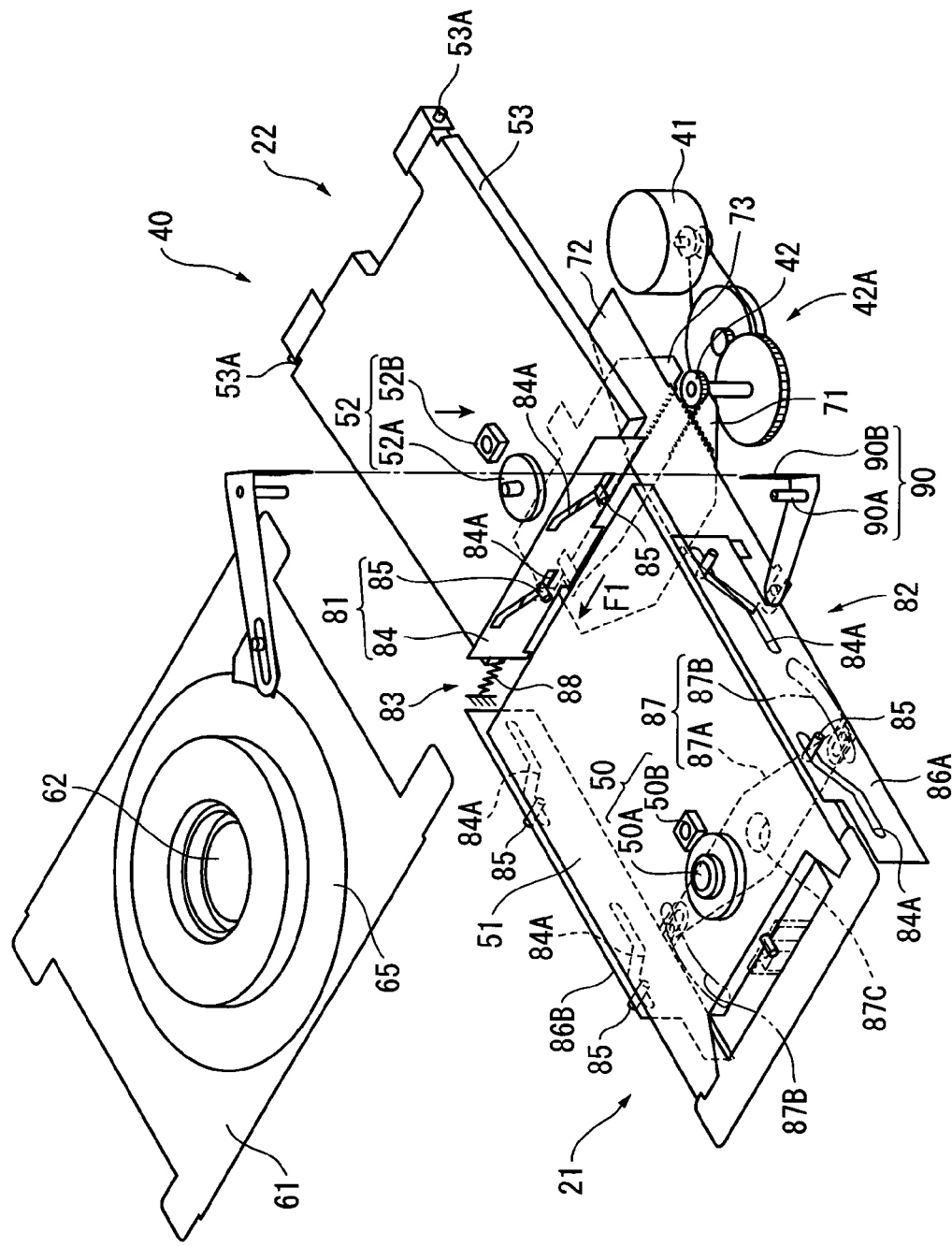
FIG. 26 is a perspective view illustrating the operation of the 4-position shifting mechanism.

The second switching mechanism 92 is operated to cause the third rack 73 to be engaged with the pinion 42 while the second rack 72 is moving backward (to advance in the direction F2) (see FIG. 23F). When the pinion 42 keeps on rotating under this condition, the second rack 72 advances backward and, at the same time, the third rack 73 moves from left to right (to advance in the direction F3) (see FIGS. 24G and 24H). The third rack 73 keeps on advancing in the direction F3 if the second rack 72 is disengaged from the pinion 42 (see FIG. 25I). Note that, referring to FIG. 23F, as the first cam slot 71A of the first switching mechanism 91 is disengaged from the first engaging pin 72A, the guide pin 71B arranged on the first rack 71 is guided by the guide slot 72C of the second rack 72. As a result, the movement of the first rack 71 is restricted. Similarly, as the second cam slot 73A of the second switching mechanism 92 is disengaged from the second engaging pin 72B, the guide pin 73B arranged on the third rack 73 is guided by the guide slot 72D of the second rack 72.

As the third rack 73 moves rightward (to advance in the direction F3), the first cam member 85 also moves rightward against the biasing force of the tensile spring 88. As a result of the rightward movement of the first cam member 84, the first cam mechanism 81 starts operating to raise the edges of the base section 53 of the second reproducing/recording mechanism 22 and make the base section 53 take the first position (see FIG. 28).

Under this condition, the second reproducing/recording mechanism 22 is located at the high first position so that it is ready for a reproducing/recording operation.

It is possible to shift the first reproducing/recording mechanism 21 and the second reproducing/recording mechanism 22 to any of the above described four positions by driving the pinion 42 to rotate in the opposite sense so as to follow the sequence that is exactly reverse to the above described sequence.

Thus, the above-described embodiment provides the following advantages.

(1) Since it includes a first disk tray 11 for mounting a first disk 1 thereon and a second disk tray 12 for mounting thereon a second disk 2 of the type different from that of the first disk 1 and both the first disk tray 11 and the second disk tray 12 laid on the first disk tray 11 can be moved into and away from the apparatus through a single disk inlet/outlet port 10A, the entire apparatus can be downsized to reduce the space that the apparatus occupies, although the apparatus can reproduce data from and record data onto a plurality of disks of different types. Thus, the embodiment is a space saving apparatus, where the substrate can be arranged without difficulty so that the freedom of laying out the components is greatly enhanced.

(2) The first reproducing/recording mechanism 21 for reproducing data from and/or recording data onto the first disk 1 and the second disk 2 and the second reproducing/recording mechanism 22 for reproducing data from and/or recording data onto the second disk 2 are arranged respectively at fore and back positions relative to the disk inlet/outlet port 10A. Thus, the use of the mechanisms can be accommodated by a single tray driving mechanism to reduce the space the apparatus occupies. Additionally, the lateral spaces can be utilized effectively because the mechanisms are arranged respectively at the fore and back positions. Still additionally, it is possible to record the data reproduced from the first reproducing/recording mechanism 21 onto the second reproducing/recording mechanism 22 or vice versa.

(3) Since the first disk 1 is in fact a cartridge/disk combination including a disk main body 1A contained in a cartridge 1B and the second disk 2 is a bare disk, a single reproducing/recording apparatus can be used to reproduce data from and record data onto a plurality of disks having different profiles.

(4) Since the first disk 1 is a disk adapted to be used with a blue laser beam for reproducing/recording of data and the second disk 2 is a disk adapted to be used with a red laser beam or a blue laser beam for reproducing/recording of data, a single reproducing/recording apparatus can be used to reproduce data from and record data onto a plurality of disks for which different reproducing/recording technique need to be used.

(5) Since the embodiment is provided with a locking mechanism 13 for locking the first disk tray 11 and the second disk tray 12 laid on the first disk tray 11 together, the second disk tray 12 would not come off from the first disk tray 11 when the disk trays 11 and 12 are moved at the same time.

(6) Since the locking mechanism 13 includes a pair of resilient detent members 11D arranged on the first disk tray 11 and provided at the front ends thereof with respective engaging projections 11C and a pair of engaging holes 12B cut through the second disk tray 12 and adapted to be engaged respectively with the corresponding engaging projections 11C, the locking function of the locking mechanism 13 is satisfactory when the engaging projections 11C and the respective engaging holes 12B are reliably engaged with each other due to the resiliency of the resilient detent members 11D.

(7) Since the front ends of the resilient detent members 11D also operate to align the first disk 1, the number of components of the embodiment can be reduced.

(8) The mechanism for moving a plurality of disks to the single disk inlet/outlet port 10A includes a second tray driving mechanism 32 to be used for driving the second disk tray 12 to move to the side of the disk inlet/outlet port 10A and a first tray driving mechanism 31 to be used for driving the first disk tray 11 that carries thereon the second disk tray 12 to move to the side of the disk inlet/outlet port 10A. Thus, a plurality of disk trays can be moved individually and separately. Additionally, since the first tray driving mechanism 31 includes a tray driving motor 331, a first gear unit 34 linked to the tray driving motor 331 and a first tray rack 35 held in engagement with the first gear unit 34 and arranged at a lateral side of the first disk tray 11, this tray driving mechanism can be made to have a simple configuration. Still additionally, since the second tray driving mechanism 32 includes a tray driving motor 332, a second gear unit 36 linked to the tray driving motor 332 and a second tray rack 37 held in engagement with the second gear unit 36 and arranged at a lateral side of the second disk tray 12, this tray driving mechanism can also be made to have a simple configuration just like the first tray driving mechanism 31. Furthermore, since the second gear unit 36 of the second tray driving mechanism 32 includes a loosing mechanism 38 to be used for separating the drive force of the second tray rack 37 from the tray driving motor 332 without load when moving the first disk tray 11 to the disk inlet/outlet port 10A with the second disk tray 12 laid thereon, the second disk tray 12 can be reliably and safely handed over from the second tray driving mechanism 32 to the first tray driving mechanism 31 even when the tray driving motor 332 of the second tray driving mechanism 32 is at rest and the first tray driving mechanism 31 is operating.

(9) Since the loosing mechanism 38 includes a base gear 38A, an idle gear 38B arranged coaxially with the base gear 38A so as to be rotatable relative to the base gear 38A, and a biasing member 39 for biasing the idle gear 38B in the sense of rotation P of the base gear 38A when moving the second disk tray 12 toward the disk inlet/outlet port 10A, the idle gear 38B can be reliably made to idly rotate relative to the base gear 38A by effectively utilizing the biasing force of the biasing member 39. As a result, the second tray driving mechanism 32 is free from any undesired load to eliminate troubles.

(10) Since there is provided a 4-position shifting mechanism 40 to be used for shifting the position of each of the first reproducing/recording mechanism 21 and the second reproducing/recording mechanism 22 to one of the predetermined four positions, the operation of mounting and releasing disks can be conducted smoothly by raising and lowering the reproducing/recording mechanisms 21 and 22 separately.

Additionally, since the 4-position shifting mechanism 40 includes a motor 41, a pinion 42 linked to the motor 41, first, second and third racks 71, 72 and 73 engaged with the pinion 42, a first cam mechanism 81 linking the first rack 71 and the second reproducing/recording mechanism 22, a second cam mechanism 82 linking the second rack 72 and the first reproducing/recording mechanism 21, a third cam mechanism 83 linking the third rack 73 and the second reproducing/recording mechanism 22, a first switching mechanism 91 for switching the engagement of the first rack 71 and the pinion 42 to the engagement of the second rack 72 and the pinion 42 and a second switching mechanism 92 for switching the engagement of the second rack 72 and the pinion 42 to the engagement of the third rack 73 and the pinion 42, the position of each of the first reproducing/recording mechanism 21 and the second reproducing/recording mechanism 22 can be shifted to one of the predetermined four positions by means of a single drive source. In other words, while two drive sources are conventionally used for switching two reproducing/recording mechanisms, the embodiment having the above-described configuration can switch each of the two reproducing/recording mechanisms to any of the four positions by means of a single drive source.

(11) Since the first reproducing/recording mechanism 21 has a traversing mechanism 50 arranged oppositely relative to the recording area of the first disk 1 or that of the second disk 2, a clamping mechanism 60 arranged oppositely relative to the traversing mechanism 50 with the first disk 1 or the second disk 2 interposed between them in order to clamp the first disk 1 or the second disk 2, whichever appropriate, and a keep member 64 for biasing the first disk 1 toward the first disk tray 11 when clamping the first disk 1 by means of the clamping mechanism 60, the operation of raising the first disk 1 can be suppressed by the keep member 64 regardless if the traversing mechanism 50 is provided with a sensor (not shown) for raising the first disk 1 upward so that the operation of reproducing data from the first disk 1 can be conducted accurately.

(12) Since the clamping mechanism 60 includes a clamper 62 for holding the second disk 2 and a back and forth moving mechanism 63 adapted to move the clamper 62 toward and away from the first disk tray 11 and the back and forth moving mechanism 63 is arranged in such a way that the distance by which the clamper 62 is separated from the first disk tray 11 is sufficiently large to allow the second disk tray 12 that is mounted by the second disk 2 to move between the disk inlet/outlet port 10A and the second reproducing/recording mechanism 22, the second disk tray 12 that is mounted by the second disk 2 can move in the first reproducing/recording mechanism 21 without interference.

(13) The second cam mechanism 82 includes a pair of second cam members 86A and 86B held in such a way that they can freely move back and force relative to the frame 10B in the moving directions of the second rack 72, two pairs of engaging pins 85 arranged at the lateral edges of the base section 51 and engaged with respective cam slots 84A that are cut through the second cam members 86A and 86B and an interlocking mechanism 87 for interlocking the two cam members 86A and 86B. Thus, drive force is transmitted from a single second rack 72 to two cam members 86A and 86B by way of an interlocking mechanism 87 so that the base section 51 of the first reproducing/recording mechanism 21 is subjected to force at the opposite lateral sections and hence the base section 51 is prevented from being inclined.

(14) The interlocking mechanism 87 includes an arm 87A having its opposite ends thereof linked respectively to the paired second cam members 86A and 86B and its center rotatably supported by the frame 10B. Thus, the interlocking mechanism 87 is structurally simplified.

(15) The second care member 86A and the disk member 65 are linked to each other by way of a clamping/interlocking mechanism 90 that interlocks them. Thus, operation of raising the first reproducing/recording mechanism 21 and that of clamping it can be carried out by means of a single drive source in a synchronized manner when data is reproduced from or recorded onto the first disk 1 that is in fact a cartridge/disk combination. Therefore, the apparatus is structurally simplified.

(16) The first switching mechanism 91 includes a first cam slot 71A cut through the first rack 71 and a first engaging pin 72A having its base end secured to the second rack 72. Similarly, the second switching mechanism 92 includes a second cam slot 73A cut through the third rack 73 and a second engaging pin 72B having its base end secured to the second rack 72. Thus, the racks can be manufactured with ease because they are produced by forming pins on plate members and cutting slots through them.

Incidentally, the scope of the present invention is not restricted to the above specific embodiment, but includes modifications and improvements as long as an object of the present invention can be attained.

For example, while the above described embodiment is adapted to accommodate two disks of different types, the present invention can also deal with three or more than three disks of different types. Then, the first disk tray, the second disk tray, the third disk tray, the fourth disk tray and so on may be brought in depending on the number of disks to be dealt with. Furthermore, the number of reproducing/recording mechanisms may be raised depending on the number of disks to be dealt with.

For the purpose of the invention, a bare disk may be used as the first disk 1 and a cartridge/disk combination may be used for the second disk 2.

While the disk main body 1B is provided at the center thereof with a clamper 1C in the cartridge/disk combination of the above described embodiment, a cartridge/disk combination that has no clamper and in which the disk main body is arranged on a cartridge may also be used for the purpose of the invention.

What is claimed is:

1. A reproducing/recording apparatus comprising a first disk tray for mounting a first disk thereon and a second disk tray for mounting a second disk that is of a type different from the type of the first disk thereon, the first disk tray being adapted to be moved into and away from the apparatus through a single disk inlet/outlet port with the second disk tray laid thereon,
    wherein a first reproducing/recording mechanism for reproducing data from and/or recording data onto the first disk and a second reproducing/recording mechanism for reproducing data from and/or recording data onto the second disk are arranged respectively at fore and back positions relative to the disk inlet/outlet port, and
    a second tray driving mechanism to be used for driving the second disk tray to move to the side of the disk inlet/outlet port and a first tray driving mechanism to be used for driving the first disk tray in a state of carrying thereon the second disk tray to move to the side of the disk inlet/outlet port, said first tray driving mechanism having a drive source, a first gear unit linked to the drive source and a first tray rack held in engagement with the first gear unit and arranged at the first disk tray, said second tray driving mechanism having a drive source, a second gear unit linked to the drive source and a second tray rack held in engagement with the second gear unit and arranged at the second disk tray, said second gear unit having a loosing mechanism to be used for separating the drive force of the second tray rack from the second gear unit without load when moving the first disk tray to the disk inlet/outlet port with the second disk tray laid thereon.

2. The reproducing/recording apparatus according to claim 1, wherein
    said first disk is a disk adapted to be used with a blue laser beam for reproducing/recording of data and said second disk is a disk adapted to be used with a red laser beam or a blue laser beam for reproducing/recording of data.

3. The reproducing/recording apparatus according to claim 1, further comprising:
    a locking mechanism for locking the first disk tray and the second disk tray laid on the first disk tray together.

4. The reproducing/recording apparatus according to claim 3, wherein
    said locking mechanism has a resilient detent member arranged on the first disk tray and provided at the front end thereof with an engaging projection and an engaging hole cut through the second disk tray and adapted to be engaged with the corresponding engaging projection.

5. The reproducing/recording apparatus according to claim 4, wherein said resilient detent member is adapted to align the first disk.

6. The reproducing/recording apparatus according to claim 1, wherein
said first reproducing/recording mechanism reproduces data from and/or records data onto the second disk.

7. The reproducing/recording apparatus according to claim 1, wherein
said loosing mechanism has a base gear, an idle gear arranged coaxially with the base gear so as to be rotatable relative to the base gear and a biasing member for biasing the idle gear in the sense of rotation of the base gear when moving the second disk tray toward the disk inlet/outlet port.

8. A reproducing/recording apparatus comprising a first disk tray for mounting a first disk thereon and a second disk tray for mounting a second disk that is of a type different from the type of the first disk thereon, the first disk tray being adapted to be moved into and away from the apparatus through a single disk inlet/outlet port with the second disk tray laid thereon,
wherein a first reproducing/recording mechanism for reproducing data from and/or recording data onto the first disk and a second reproducing/recording mechanism for reproducing data from and/or recording data onto the second disk are arranged respectively at fore and back positions relative to the disk inlet/outlet port; and
a 4-position shifting mechanism to be used for shifting the position of each of the first reproducing/recording mechanism and the second reproducing/recording mechanism to one of the predetermined four positions,
said 4-position shifting mechanism having a drive source, a pinion linked to the drive source, a first rack to be engaged with the pinion, a first cam mechanism linking the first rack and the second reproducing/recording mechanism and driving said second reproducing/recording mechanism to move between the first position and the second position in response to the movement of the first rack, a second rack to be engaged with the pinion, a second cam mechanism linking the second rack and the first reproducing/recording mechanism and driving said first reproducing/recording mechanism to move between a first position and a second position in response to the movement of the second rack, a third rack to be engaged with said pinion and arranged oppositely relative to said first rack with said pinion interposed between them, a third cam mechanism linking the third rack and the second reproducing/recording mechanism and driving said second reproducing/recording mechanism to move between the second position and the first position in response to the movement of the third rack, a first switching mechanism for switching the engagement of the first rack and the pinion to the engagement of the second rack and the pinion and a second switching mechanism for switching the engagement of the second rack and the pinion to the engagement of the third rack and the pinion.

9. A reproducing/recording apparatus comprising a first disk tray for mounting a first disk thereon and a second disk tray for mounting a second disk that is of a type different from the type of the first disk thereon, the first disk tray being adapted to be moved into and away from the apparatus through a single disk inlet/outlet port with the second disk tray laid thereon,
wherein said first disk is a cartridge/disk combination including a disk main body contained in a cartridge and said second disk is a bare disk, and
wherein said first reproducing/recording mechanism has a traversing mechanism arranged oppositely relative to the recording area of said cartridge/disk combination or said bare disk, a clamping mechanism arranged oppositely relative to the traversing mechanism with the cartridge/disk combination or the bare disk interposed between them in order to clamp said cartridge/disk combination or said bare disk, whichever appropriate, and a keep member for biasing the cartridge/disk combination toward the first disk tray when clamping said cartridge/disk combination by means of the clamping mechanism.

10. The reproducing/recording apparatus according to claim 9, wherein
said clamping mechanism has a holding section for holding a disk and a back and forth moving mechanism adapted to move the holding section toward and away from the first disk tray, the back and forth moving mechanism being arranged in such a way that the distance by which the holding section is separated from the first disk tray is sufficiently large to allow the second disk tray mounted by the second disk to move between the disk inlet/outlet port and the second reproducing/recording mechanism.

* * * * *